(12) United States Patent
Lopez et al.

(10) Patent No.: US 12,049,431 B2
(45) Date of Patent: *Jul. 30, 2024

(54) AGRICULTURAL ADJUVANT COMPRISING MICROFIBRILLATED CELLULOSE

(71) Applicant: AMVAC Chemical Corporation, Newport Beach, CA (US)

(72) Inventors: Humberto Benito Lopez, Chino Hills, CA (US); Lisiane Zeni, Newport Beach, CA (US)

(73) Assignee: AMVAC Chemical Corporation (Subsidiary of American Vanguard Corporation), Newport Beach, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/751,441

(22) Filed: Jan. 24, 2020

(65) Prior Publication Data

US 2020/0260721 A1 Aug. 20, 2020

Related U.S. Application Data

(60) Provisional application No. 62/916,764, filed on Oct. 17, 2019, provisional application No. 62/896,762, (Continued)

(51) Int. Cl.
*A61K 9/70* (2006.01)
*A01N 25/02* (2006.01)
(Continued)

(52) U.S. Cl.
CPC .............. *C05B 15/00* (2013.01); *A01N 25/02* (2013.01); *A01N 25/04* (2013.01); *A01N 25/26* (2013.01);
(Continued)

(58) Field of Classification Search
CPC ........ C05B 15/00; A01N 25/02; A01N 25/04; A01N 25/26; A01N 25/30; A01N 53/00;
(Continued)

(56) References Cited

U.S. PATENT DOCUMENTS 4,341,807 A 7/1982 Turbak et al.
4,374,702 A 2/1983 Turbak et al.
(Continued)

FOREIGN PATENT DOCUMENTS

CN 102100229 A 6/2011
CN 104082287 A 10/2014
(Continued)

OTHER PUBLICATIONS

Sena Velez et al. Plant Pathology (2015) 64, 767-775. (Year: 2015).*
(Continued)

*Primary Examiner* — Mina Haghighatian
*Assistant Examiner* — Janice Y Silverman
(74) *Attorney, Agent, or Firm* — Mintz, Levin, Cohn, Ferris, Glovsky and Popeo, P.C.

(57) ABSTRACT

An agricultural adjuvant includes microfibrillated cellulose, a dispersant or wetting agent, in a liquid carrier that has been subjected to shear conditions. The resultant adjuvant displays useful rheological structure and the adjuvant is added to agricultural formulations to stabilize and impart useful rheology to the formulations.

8 Claims, 1 Drawing Sheet

Related U.S. Application Data filed on Sep. 6, 2019, provisional application No. 62/797,124, filed on Jan. 25, 2019.

(51) Int. Cl.

| | | |
|---|---|---|
| A01N 25/04 | (2006.01) | |
| A01N 25/26 | (2006.01) | |
| A01N 25/30 | (2006.01) | |
| A01N 53/00 | (2006.01) | |
| A01N 57/12 | (2006.01) | |
| A24D 1/02 | (2006.01) | |
| A61K 33/44 | (2006.01) | |
| A61M 15/06 | (2006.01) | |
| C01B 32/156 | (2017.01) | |
| C05B 15/00 | (2006.01) | |
| C05G 3/40 | (2020.01) | |
| C05G 3/60 | (2020.01) | |
| C05G 5/12 | (2020.01) | |
| C05G 5/18 | (2020.01) | |
| C05G 5/20 | (2020.01) | |
| C08L 1/02 | (2006.01) | |
| D21H 27/00 | (2006.01) | |
| A61K 31/20 | (2006.01) | |
| A61K 33/243 | (2019.01) | |
| D21H 19/38 | (2006.01) | |

(52) U.S. Cl.
CPC ............. *A01N 25/30* (2013.01); *A01N 53/00* (2013.01); *A01N 57/12* (2013.01); *C05G 3/44* (2020.02); *C05G 3/60* (2020.02); *C05G 5/12* (2020.02); *C05G 5/18* (2020.02); *C05G 5/20* (2020.02); *C08L 1/02* (2013.01)

(58) Field of Classification Search
CPC . A01N 57/12; C05G 3/44; C05G 3/60; C05G 5/12; C05G 5/18; C05G 5/20; C05G 5/27; C05G 5/35; C08L 1/02; C08L 5/00
See application file for complete search history.

(56) References Cited

U.S. PATENT DOCUMENTS

| | | | |
|---|---|---|---|
| 4,481,077 A | 11/1984 | Herrick | |
| 5,185,024 A | 2/1993 | Siemer et al. | |
| 5,385,640 A | 1/1995 | Weibel et al. | |
| 5,405,953 A | 4/1995 | Banker et al. | |
| 5,614,558 A | 3/1997 | James et al. | |
| 8,420,573 B2 | 4/2013 | Stern | |
| 8,807,870 B2 | 8/2014 | Laukkanen et al. | |
| 2005/0034636 A1 | 2/2005 | Schlesiger et al. | |
| 2005/0260240 A1* | 11/2005 | Narayanan | A01N 25/24 424/405 |
| 2007/0027108 A1 | 2/2007 | Yang et al. | |
| 2009/0143447 A1 | 6/2009 | Arthur et al. | |
| 2010/0120617 A1 | 5/2010 | Dyllick-Brenzinger et al. | |
| 2010/0160168 A1 | 6/2010 | Lindner | |
| 2013/0108373 A1 | 5/2013 | Laukkanen et al. | |
| 2013/0137578 A1 | 5/2013 | Xu et al. | |
| 2013/0331267 A1 | 12/2013 | Aulisa | |
| 2014/0011675 A1 | 1/2014 | Knochenmus et al. | |
| 2014/0066303 A1 | 3/2014 | Liu et al. | |
| 2014/0274719 A1 | 9/2014 | Davison | |
| 2014/0342905 A1 | 11/2014 | Bullis et al. | |
| 2015/0133296 A1 | 5/2015 | Ugalde Martinez et al. | |
| 2015/0239788 A1 | 8/2015 | Yamashita | |
| 2016/0032168 A1 | 2/2016 | Al-Bagoury et al. | |
| 2016/0227782 A1 | 8/2016 | Oevreboe et al. | |
| 2017/0121908 A1 | 5/2017 | Holtan et al. | |
| 2017/0273298 A1 | 9/2017 | Rosenberg Read et al. | |
| 2017/0369386 A1 | 12/2017 | Dave et al. | |
| 2018/0094214 A1* | 4/2018 | Labib | C11D 11/0023 |
| 2018/0265425 A1 | 9/2018 | Li et al. | |
| 2020/0236926 A1 | 7/2020 | Lopez et al. | |
| 2020/0239375 A1 | 7/2020 | Lopez et al. | |
| 2020/0392051 A1 | 12/2020 | Casalins Cunado | |
| 2021/0127684 A1 | 5/2021 | Singh et al. | |

FOREIGN PATENT DOCUMENTS

| | | |
|---|---|---|
| CN | 104082290 A | 10/2014 |
| CN | 105026477 A | 11/2015 |
| CN | 105229228 A | 1/2016 |
| CN | 106132448 A | 11/2016 |
| CN | 108347920 A | 7/2018 |
| EP | 0 298 136 A1 | 1/1989 |
| GB | 2282327 B | 1/1998 |
| JP | S59-039789 A | 3/1984 |
| JP | 2002-502907 A | 1/2002 |
| JP | 2006-503061 A | 1/2006 |
| JP | 2009-067910 A | 4/2009 |
| JP | 2009-530289 A | 8/2009 |
| JP | 2010-505798 A | 2/2010 |
| JP | 2013-082796 A | 5/2013 |
| JP | 2014-521770 A | 8/2014 |
| JP | 2014-524963 A | 9/2014 |
| JP | 2016-069293 A | 5/2016 |
| JP | 2016-069294 A | 5/2016 |
| JP | 2016-069295 A | 5/2016 |
| JP | 2017-519909 A | 7/2017 |
| JP | 2018-517756 A | 7/2018 |
| JP | 2020-510080 A | 4/2020 |
| WO | WO-99/55645 A1 | 11/1999 |
| WO | WO-01/66600 A1 | 9/2001 |
| WO | WO-2007/091942 A1 | 8/2007 |
| WO | WO-2013/154675 A1 | 10/2013 |
| WO | WO-2014/203121 A1 | 12/2014 |
| WO | WO-2015/180844 A1 | 12/2015 |
| WO | WO-2016/202500 A1 | 12/2016 |
| WO | WO-2017/148990 A1 | 9/2017 |
| WO | WO-2019/035881 A1 | 2/2019 |
| WO | WO-2019/035881 A8 | 2/2020 |
| WO | WO-2020/109654 A1 | 6/2020 |
| WO | WO-2020/254891 A1 | 12/2020 |

OTHER PUBLICATIONS

International Search Report and Written Opinion issued in International Application No. PCT/US20/15088, mailed Jun. 4, 2020 (Jun. 4, 2020). 12 pages.
U.S. Appl. No. 16/751,410, filed Jan. 24, 2020, Lopez et al., Published as US-2020/0236926-A1.
U.S. Appl. No. 16/751,423, filed Jan. 24, 2020, Lopez et al., Published as US-2020/0239375-A1.
SciFinder. (2021). *Microfibrillated celluloses and Fertilizers*. [Search Results]. Retrieved Jul. 15, 2021, 210 pages.
SciFinder. (2021). *Microfibrillated celluloses and Rheology Modifier and Pesticide*. [Search Results]. Retrieved Jul. 15, 2021, 4 pages.
U.S. Appl. No. 16/751,410.
U.S. Appl. No. 16/751,423.
"SmartChoice™ HC" Safety Data Sheet. AMVAC. 1449 Version #: 3.0, Revision date May 9, 2018, Issue date Apr. 6, 2016. 11 pages.
CAS Registry No. 11138-66-2, date accessed Apr. 20, 2020. 1 page.
CAS Registry No. 141-43-5, date accessed Apr. 20, 2020. 1 page.
CAS Registry No. 2634-33-5, date accessed Apr. 20, 2020. 1 page.
CAS Registry No. 54593-83-8, date accessed on Apr. 20, 2020. 1 page.
CAS Registry No. 57-55-6, date accessed Apr. 20, 2020. 1 page.
CAS Registry No. 64742-94-5, date accessed Apr. 20, 2020. 1 page.
CAS Registry No. 7732-18-5, date accessed Apr. 20, 2020. 1 page.
CAS Registry No. 82657-04-3, date accessed Apr. 20, 2020. 1 page.
CAS Registry No. 9004-34-6, date accessed Apr. 20, 2020. 4 pages.
Castro, M.J.L. et al. (2013). "Surfactants in Agriculture. Chapter 7—Green Materials for Energy, Products and Depollution, Environmental Chemistry for a Sustainable World 3." pp. 287-334.

(56) References Cited

OTHER PUBLICATIONS

International Search Report and Written Opinion issued in International Application No. PCT/US20/15084, mailed Apr. 16, 2020 (Apr. 16, 2020). 8 pages.
International Search Report and Written Opinion issued in International Application No. PCT/US20/15086, mailed Mar. 31, 2020 (Mar. 31, 2020). 9 pages.

* cited by examiner

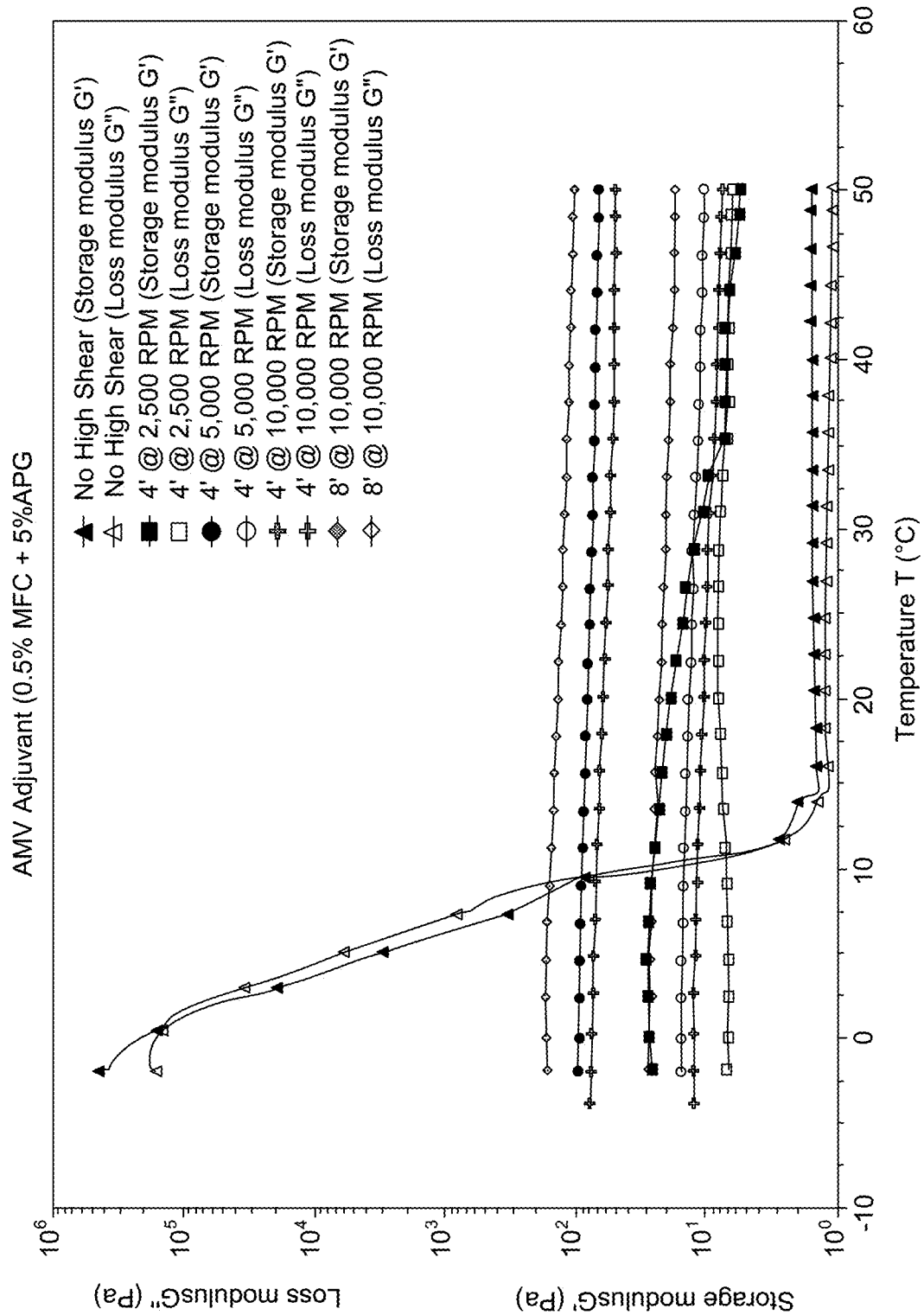

AGRICULTURAL ADJUVANT COMPRISING MICROFIBRILLATED CELLULOSE

CROSS-REFERENCES TO RELATED APPLICATIONS

This application claims the benefit of provisional application Ser. No. 62/797,124 filed Jan. 25, 2019, provisional application Ser. No. 62/896,762 filed Sep. 6, 2019, and provisional application Ser. No. 62/916,764 filed Oct. 17, 2019, each of which are incorporated herein by reference.

BACKGROUND

Agricultural adjuvants are employed in agrochemical formulations to enhance activity and/or improve physical properties such as stabilizing formulations susceptible to alteration on storage and/or modify behavior on application. An exemplary rheological property targeted by adjuvants is viscosity. A variety of formulation classifications benefit from viscosity control for stabilization including, for example, suspension concentrates (SC), suspo-emulsions (SE), capsule suspensions (CS), and the like. Rheology modifiers can also be employed to promote sticking in foliar applications and to prevent run-off. In such applications, the rheology modifier may display thixotropic behavior which allows for shear thinning during application, while quickly returning to a viscous state when shear forces cease.

Common viscosity modifiers employed in agrochemical formulations include xanthan gum and guar gum. While such adjuvants operate in simple systems, they can be less effective in complex formulations, especially those having high salt concentrations. Such complex formulations include those that co-administer fertilizers and/or other micronutrients, where the adjuvants tend to agglomerate. Improvements to existing rheology modification can also be realized where the adjuvant is robust over a wider pH range and/or temperature range. Finally, there is a potential benefit to expanding the compatibility of viscosity modifiers with surfactants.

Embodiments disclosed herein may address one or more of the above issues of existing rheology modifiers and may provide other advantages that will be apparent to those skilled in the art.

SUMMARY OF THE INVENTION

In some aspects, embodiments herein relate to adjuvant compositions comprising a microfibrillated cellulose (MFC), a surfactant or dispersant, and a liquid carrier, wherein the adjuvant composition is formed by subjecting the MFC, the surfactant or dispersant, and the liquid carrier to shear conditions sufficient to alter the rheological structure of commercial MFC.

In some aspects, embodiments herein relate to adjuvant compositions comprising a microfibrillated cellulose, a surfactant or dispersant, and a fertilizer, wherein the adjuvant composition is formed by subjecting the microfibrillated cellulose, the surfactant or dispersant, and the fertilizer to shear conditions sufficient to alter the rheological structure of commercial MFC.

In some aspects, embodiments herein relate to compositions comprising a formulation of an agriculturally active ingredient, and an adjuvant composition comprising a microfibrillated cellulose, a surfactant or dispersant, and a liquid carrier, wherein the adjuvant composition is formed by subjecting the microfibrillated cellulose, the surfactant or dispersant, and the liquid carrier to shear conditions sufficient to alter the rheological structure of commercial MFC.

In some aspects, embodiments disclosed herein relate to methods comprising adding to a fertilizer or a high ionic strength solution an adjuvant composition comprising a microfibrillated cellulose, a surfactant or dispersant, and a liquid carrier, wherein the adjuvant composition is formed by subjecting the microfibrillated cellulose, the surfactant or dispersant, and the liquid carrier to shear conditions sufficient to alter the rheological structure of commercial MFC and wherein an amount of adjuvant added is sufficient to provide a target viscosity to the agrochemical formulation.

BRIEF DESCRIPTION OF THE DRAWINGS

Various embodiments of the present disclosure will be described herein below with reference to The FIGURE wherein:

The FIGURE shows a plot of G', G" versus temperature for various suspensions of MFC created under varying shear conditions. Shear conditions range from material as supplied by Borregaard AS to the same material further subjected to shear.

DETAILED DESCRIPTION OF THE INVENTION

Embodiments disclosed herein provide adjuvant compositions that include microfibrillated cellulose (MFC) and a wetting agent (surfactant) and/or a dispersant in a liquid carrier. The mixture of these three components are subjected to high shear which further alters the MFC structure (relative to the commercial product) to provide adjuvant compositions that display unexpected characteristics. First, the adjuvant is operable in any aqueous media independent of ionic strength. This observation is particularly surprising because at high ionic strength conventional rheology modifiers, such as xanthan gum, gellan gum, alginate, guar gum or other polysaccharides, fail to create rheological structure because they flocculate rather than impart the desired rheology. Furthermore, the presence of certain multivalent cations such as calcium ion or magnesium ion, even in relatively very low concentrations, tend to cause conventional polysaccharide-based rheology modifiers to flocculate. MFC-based adjuvants disclosed herein buck this trend by being compatible with such multivalent cations. Similarly, the use of clays, aluminosilicates and other hydrophilic or hydrophobic silicas in lieu of polysaccharide based rheology modifiers has proven to have limited success in highly ionic media and such successes are very formulation specific and work in only limited cases. Finally, the adjuvants disclosed herein are operable at appreciably lower concentrations of MFC compared to untreated commercial MFC. These and other advantages will be apparent to those skilled in the art.

I. Definitions

The abbreviations used herein generally comport with their conventional meaning within the chemical and biological arts.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

"Composition" as used herein is intended to encompass a product comprising the specified ingredients in the specified amounts, as well as any product, which results, directly or indirectly, from combination of the specified ingredients in the specified amounts.

As used herein, "agriculturally active compound," or "agricultural active," refers to a compound or substrate which have an effect on agricultural crops, including nutritional, pesticidal and herbicidal effects, among others.

As used herein "ionic strength" refers to a measure of the concentration of ions (i.e., electrically charged species) in a solution. For the purpose of determining whether ionic strength is "high," an ionic strength is "high" when conventional rheology modifiers such as xanthan and/or guar gums begin to agglomerate and/or otherwise fail to impart sustained thixotropic character to the composition. "High ionic strength" includes ion concentrations obtained from solutions that are about 5% of saturation in any functional ion. For example, NaCl is soluble in water at saturation at about 360 g/L. Accordingly, a "high ionic strength" relative to NaCl would include 18 g NaCl/L in water. With respect to the performance of MFC compared to such agents as xanthan gum, MFC also benefits from compatibility with cationic surfactants and multivalent cations (which are ubiquitous in micronutrients) where xanthan gum fails. In the case of multivalent cations, the concentrations of such ions can be very low, including trace amounts, and still cause agglomeration of xanthan gum or guar gum.

As used herein, the term "dry matter weight concentration" refers to the absolute weight percent of MFC, excluding water and other absorbed liquids in the formulation. The term "dry matter," or "solids content," in the context of the amount of MFC refers to the amount of MFC if all the solvent (typically water) is removed. Accordingly, providing the amount of MFC as a concentration of "dry matter" provides the amount as "% w/w" relative to the overall weight of the composition in the absence of solvent.

"Microfibrillated cellulose," or "MFC," (also known as "reticulated" cellulose or as "superfine" cellulose, or as "cellulose nanofibrils"), as used herein, refers to a cellulose-based product and is described, for example, in U.S. Pat. Nos. 4,481,077, 4,374,702 and 4,341,807, each of which is incorporated herein by reference. In embodiments, microfibrillated cellulose has reduced length scales (diameter, fibril length) vis-à-vis cellulose fibers, improved water retention and adjustable viscoelastic properties. MFC with improved or tailored properties for specific applications are known, such as those disclosed in WO 2007/091942 and WO 2015/180844, each of which is incorporated herein by reference.

Microfibrillated cellulose (MFC) is a product derived from cellulose and is commonly manufactured in a process in which cellulose fibers are opened up and unraveled to form fibrils and microfibrils/nanofibrils by (repeated) passage through a geometrical constraint. For example, MFC may be produced as disclosed in WO 2015/180844 by passing a liquid composition of cellulose through a small diameter orifice in which the composition is subjected to a pressure drop of at least 3000 psig and a high velocity shearing action followed by a high velocity decelerating impact. The passage of the MFC composition through the orifice is repeated until the cellulose composition becomes a substantially stable composition. This process converts the cellulose into microfibrillated cellulose, which has valuable physical properties (gel forming capability, thixotropic properties, high water retention value WRV and the like) without substantial chemical change of the cellulose starting material.

Another process for manufacturing microfibrillated cellulose is described in U.S. Pat. No. 5,385,640 which discloses a means for refining fibrous cellulosic material into a dispersed tertiary level of structure and thereby achieving desirable properties attendant with such structural change. The cellulosic fiber produced in this way is referred to as "microdenominated cellulose (MDC)", a sub-group of microfibrillated cellulose. Such microfibrillated cellulose is obtained by repeatedly passing a liquid composition of fibrous cellulose through a zone of high shear, which is defined by two opposed surfaces, with one of the surfaces rotating relative to the other, under conditions and for a length of time sufficient to render the composition substantially stable and to impart to the composition a water retention that shows consistent increase with repeated passage of the cellulose composition through the zone of high shear. This process increases the viscosity and leads to a gel structure, until no further increase in viscosity is achieved. After such a treatment, homogeneous MFC is obtained and the conversion of cellulose to microcellulose as such is concluded.

"Microfibrillated cellulose" (MFC) in accordance with embodiments disclosed herein is to be understood as relating to cellulose fibers that have been subjected to a mechanical treatment resulting in an increase of the specific surface and a reduction of the size of cellulose fibers, in terms of cross-section (diameter) and/or length, wherein said size reduction leads to "fibrils" having a diameter in the nanometer range and a length in the micrometer range.

The starting cellulose material to generate MFC does not contain a significant portion of individualized and "separated" cellulose "fibrils." The cellulose in wood fibres is an aggregation of fibrils. In cellulose (pulp), elementary fibrils are aggregated into microfibrils which are further aggregated into larger fibril bundles and finally into cellulosic fibres. The diameter of wood based fibres is typically in the range 10-50 microns (with the length of these fibres being even greater). When the cellulose fibres are microfibrillated, a heterogeneous mixture of "released" fibrils with cross-sectional dimensions and lengths from nm to microns may result. Fibrils and bundles of fibrils may co-exist in the resulting microfibrillated cellulose.

Microfibrillated cellulose contains fibrils in constant interaction with each other in a three-dimensional network. The rheological properties of MFC—high viscosity at rest, shear thinning (thixotropic) behavior, water holding capacity—are a result of the existence of this entangled network.

In the MFC products disclosed herein, individual fibrils or fibril bundles can be identified and easily discerned by way of conventional optical microscopy, for example at a magnification of 40× or by use of electron microscopy.

As indicated above any type of microfibrillated cellulose (MFC) may be used in connection with embodiments disclosed herein as long as the fiber bundles as present in the original cellulose pulp are sufficiently separated in the process of making MFC so that the average diameter of the resulting fibrils is in the nanometer-range and therefore more surface of the overall cellulose-based material has been created, vis-à-vis the surface available in the original cellulose material. MFC may be prepared according to any of the processes described in the art, including the references specifically cited above.

In embodiments, the microfibrillated cellulose may be characterized by the following features: The microfibrillated cellulose forms a gel-like dispersion that has a zero shear viscosity, η0, of at least 2000 PaS, or at least 3000 Pa·s or 4000 Pa·s, or at least 5000 Pa·s, or at least 6000 Pa·s, or at least 7000 Pa·s, as measured in polyethylene glycol (PEG) as the solvent, and at a solids content of the MFC of about 0.65%.

The rheological properties, in particular zero shear viscosity can be measured on a rheometer of the type Anton Paar Physica MCR 301. The temperature in all measurements can be performed at 25° C. and a "plate-plate" geometry used (diameter: 50 mm). The rheological measurement can be performed as an oscillating measurement (amplitude sweep) to evaluate the degree of structure in the dispersions and as rotational viscosity measurements, in which case the viscosity may be measured as a function of the shear rate to evaluate the viscosity at rest (shear forces→0), as well as the shear thinning properties of the dispersions. The measurement method is further described in PCT/EP2015/001103 (EP 3 149 241).

In embodiments, the microfibrillated cellulose has a water holding capacity (also water retention capacity) of more than 40, or more than 50, or more than 60, or more than 70, or more than 75, or more than 80, or more than 90, further or more than 100. The water holding capacity is given as $(mV/mT)^{-1}$ where mV is the weight of the wet sediment and mT is the weight of dry MFC analyzed. The water holding capacity describes the ability of the MFC to retain water within the MFC structure and this relates to the accessible surface area. The water holding capacity can be measured by diluting the MFC samples to a 0.3% solids content in water and then centrifuging the sample at 1000 G for 15 minutes. The clear water phase can be separated from the sediment and the sediment weighed. The measurement method is further described in PCT/EP2015/001103 (EP 3 149 241).

There is no specific restriction in regard to the origin of the cellulose, and hence of the microfibrillated cellulose employed in embodiments disclosed herein. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g., from tunicates.

In embodiments, wood-based materials are used as raw materials, either hardwood or softwood or both (in mixtures). In embodiments, softwood is used as a raw material, either one kind or mixtures of different soft wood types.

Modified (derivatized) and non-modified (un-derivatized) cellulose/MFC may be employed. In embodiments, the microfibrillated cellulose may be unmodified with respect to its functional groups or may be physically modified or chemically modified, or both.

Chemical modification of the surface of the cellulose microfibrils may be achieved by various possible reactions of the surface functional groups of the cellulose microfibrils such as functionalizing of the hydroxyl groups, including by: oxidation, silylation reactions, etherification reactions, condensations with isocyanates, alkoxylation reactions with alkylene oxides, or condensation or substitution reactions with glycidyl derivatives. Chemical modification may take place before or after the defibrillation step.

In embodiments, cellulose microfibrils may be modified by a physical route, either by adsorption at the surface, or by spraying, or by coating, or by encapsulation of the microfibril. In embodiments, modified microfibrils can be obtained by physical adsorption of at least one compound. The MFC may also be modified by association with an amphiphilic compound (surfactant). In accordance with embodiments herein, wetting agent type surfactants in liquid media can be subjected to high shear to modify the typical commercial MFC structure.

In embodiments, the microfibrillated cellulose is not physically modified.

In embodiments, the microfibrillated cellulose is a non-modified microfibrillated cellulose, such as a non-modified microfibrillated cellulose derived from plant material.

In embodiments, the microfibrillated cellulose is prepared by a process, which comprises at least the following steps: (a) subjecting a cellulose pulp to at least one mechanical pretreatment step; (b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose; wherein the homogenizing step (b) involves compressing the cellulose pulp from step (a) and subjecting the cellulose pulp to a pressure drop.

The mechanical pretreatment step can include a refining step. The purpose of the mechanical pretreatment is to "beat" the cellulose pulp in order to increase the accessibility of the cell walls, i.e., to increase the surface area.

Prior to the mechanical pretreatment step, or in addition to the mechanical pretreatment step, enzymatic (pre)treatment of the cellulose pulp is an optional additional step that may be desirable for some applications. In regard to enzymatic pretreatment in conjunction with microfibrillating cellulose, the respective content of WO 2007/091942 is incorporated herein by reference. Any other type of pretreatment, including chemical pretreatment may also be performed.

In the homogenizing step (b), which is to be conducted after the (mechanical) pretreatment step, the cellulose pulp slurry from step (a) is passed through a homogenizer at least once, or at least two times, as described, for example, in PCT/EP2015/001103, the respective content of which is hereby incorporated by reference.

MFC employed in the adjuvant compositions disclosed herein are processed starting with commercial MFC product. The commercial MFC product is processed, thereby altering the composition, by subjecting the MFC to high shear in the presence of a wetting agent or dispersing agent. As indicated in The FIGURE, and shown in the Examples below, the shear-processed MFC imparts modified rheological structure in the presence of a dispersant or wetting agent during the shear process. In general, at typicall application temperatures anywhere from about 15° C. to about 50° C., there is a general increase in storage modulus and loss modulus. Moreover, the storage modulus and loss modulus do not vary significantly over a large temperature range. This is a dramatic change compared to simply adding MFC with no shearing.

As used herein, "loss modulus" and "storage modulus" refer to measures of stored energy in viscoelastic materials. The storage modulus (or elastic modulus, commonly denoted as G' in rheology) describes the elastic properties. The loss modulus, or plastic modulus, (G") describes the viscous properties.

As used herein, the term "surfactant" refers to a surface-active agent used to modify surface characteristics at a liquid-solid interface. Surfactants can include wetting agents and may include cationic-surfactants, anionic surfactants, zwitterionic surfactants, non-ionic surfactants. The term "wetting agent" refers to an additive used to lower the surface tension of a liquid. Surfactants include, without limitation, alkyl polyglucosides, dodecyl benzene sulfonate salts, phosphate esters, including monoesters or high monoester blends, triethanol amines, including polymeric amines, lignosulfonates, PLURONIC™ type surfactants.

As used herein, the term "dispersant" or "dispersing agent," refers to an additive used to prevent flocculation, i.e., to prevent solid particles from sticking together and forming larger agglomerations of particles. Dispersants may be used to maintain a homogeneous (even) distribution of particles, especially in suspension formulations. Exemplary dispersants include, without limitation, aryl sulfonate-formaldehyde condensates, phosphate esters, calcium and sodium lignosulfates and their derivatives, polyacrylate or its salts, ether sulfates, polyarylephenol alkoxylates, sulfonate salts, ethylene oxide/proplylene oxide block co-polymers (optionally phosphate or sulfonated), copolymers of methyl vinyl ether/maleic anhydride as mixed monoesters, comb polymer derivatives of polyetheramines, optionally phosphated or optionally sulfated alkylphenol polyglycol ethers or tristyrylphenol polyglycol ethers, cyclodextrins, molecular cages, chitosan, star polymers, dendrimers, glucans and nanogels Allosperse, and the like. In embodiments, some these latter dispersants may impart control release characteristics.

The adjuvant compositions disclosed herein impart thixotropic behavior when added to various agrochemical formulations. As used herein, "thixotropy" refers to a time-dependent shear thinning property of a composition. A composition exhibits thixotropy when it is viscous under static conditions but flows (e.g., becomes thinner, becomes less viscous) over time when subjected to an applied stress, such as being shaken, agitated, pumped or subjected to shear-stress.

As used herein, the term "suspension concentrate," or "SC," refers to a stable suspension of an agricultural active compound in an aqueous continuous phase which is intended for dilution with water before use. SC preparations generally display non-Newtonian flow characteristics.

As used herein, the term "suspo-emulsion," or "SE," refers to a stable suspension of fine particles combined with an emulsion of fine droplets of an oil in an aqueous continuous phase.

As used herein, the term "capsule suspension," or "CS," refers to a stable suspension of an encapsulated agricultural active compound in an aqueous continuous phase which is intended for dilution with water before use. The encapsulation is generally provided by polymeric compositions including, without limitation, polyureas, polyurethanes, cyclodextrins, and the like.

As used herein, the term "oil dispersion," or "oil-based suspension concentrate," or "OD," refers to a stable suspension of an agricultural active ingredient in an organic solvent fluid (and may contain other dissolved compounds) which is intended for dilution with water before use.

In general, agricultural active compounds may be provided in "particulate form." As used herein, "particulate form" may includes encapsulated agricultural active compounds (to form capsule suspensions), wettable powders (WP), water dispersible powders for slurry seed treatment (WS), water dispersible granules (WG), emulsifiable granules (EG), and emulsifiable powders (EP).

In general, agricultural active compounds may be provided in "particulate form." As used herein, "particulate form" may include encapsulated agricultural active compounds (to form capsule suspensions), gels, wettable powders (WP), water dispersible powders for slurry seed treatment (WS), water dispersible granules (WG), emulsifiable granules (EG), and emulsifiable powders (EP). Gels include any organic polymer capable of forming gel particles, such as acrylic acid based gels, including polyacrylamide, polyammonium acrylate and the like. Examples of such gels are disclosed in U.S. Pat. No. 5,185,024, which is incorporated herein by reference in its entirety. WP particulates are homogenous solids of an agricultural active together with optional fillers and other formulation ingredients in a fine powder form, generally free of visible extraneous matter and hard lumps. WS particulates are homogenenous solids of an agricultural active together with a carrier and other formulation ingredients, typically including a colorant, and in the form of a powder, generally free of visible extraneous matter and hard lumps. WG particulates are homogeneous solids of an agricultural active together with carriers and other formulation ingredients and typically designed to disintegrate in water to form a colloidal suspension. WG are generally free-flowing, mostly dust free, and generally free of visible extraneous matter and hard lumps. EG particulates are granules of an agricultural active which may be dissolved in an organic solvent together with other formulation ingredients. EG particulates are generally homogenous, and generally free of visible extraneous matter and hard lumps. EP particulates are homogenous mixtures of an agricultural active together with other formulation ingredients and supplied free-flowing powder generally free of visible extraneous matter and hard lumps, and which form an emulsion upon dilution with water.

As used herein, "biostimulant" refers to compounds or substrates used to stimulate natural processes of plants to enhance and/or benefit crop quality, soil health, nutrient efficiency, nutrient uptake, and reduce abiotic stress. Plant biostimulant products can be used in sustainable agriculture production systems and integrated pest management (IPM) programs, which can reduce the amount of irrigation water used, as well as the amount of agrochemical supplements and fertilizers. Biostimulants include, but are not limited to protein hydrolysates, humic and fulvic acids, seaweed extracts, chitosans, biopolymers, inorganic compounds, and probiotics.

The terms "stable" and "stability" as used herein, generally mean that no visible phase separation is observed (or remains substantially homogeneous) for a composition at ambient temperature for a period of at least 0.5 hour, at least 1 hour, at least 2 hours, from 0.5 to 72 hours, or from 5 days to 30 days. The adjuvants disclosed herein have also demonstrated stability on a timescale of months. Including, for example, 1 to 5 months. In the context of agricultural field, a stable agricultural composition refers to a homogeneous mixture suitable for pouring, spraying, or drip irrigation for agricultural use (e.g., applications to soil, plants, insects or animals) for at least a period of at least 0.5 to 2 hours.

II. Compositions and Methods

In embodiments, there are provided adjuvant composition comprising a microfibrillated cellulose, a surfactant or dispersant and a liquid carrier, wherein the adjuvant composition is formed by subjecting the microfibrillated cellulose, the surfactant or dispersant, and the liquid carrier to shear conditions.

The adjuvant compositions impart desirable rheological behavior when added to an agricultural formulation. The rheologic properties of the resultant compositions can be measured using a mechanical rheometer, or on a micro-scale by using a microcapillary viscometer or an optical technique such as microrheology. A rheometer is capable of measuring viscosity and elasticity of non-Newtonian materials under a wide range of conditions. The type of rheometer required for measuring rheologic properties is often dependent on the relevant shear rates and timescales as well as sample size and viscosity. For example, capillary rheometry is useful for measuring the viscosity profiles of suspensions and slurries containing relatively large particles, at high particle loadings.

Rheological structure is defined by the values measured of certain parameters well understood in the science of rheology. These include the storage modulus or elastic modulus (also commonly denoted as G' in rheology) which describes the elastic properties, and the loss modulus or plastic modulus (G") which describes the viscous properties. Included in the definition of rheological structure is what is known as the shear thinning (thixotropic) behavior in rheology. Thixotropic fluids are shear-thinning. The viscosity of the thixotropic fluid decreases as shear is applied to it. Their viscosity decreases under the same stress over time because of a destructuring of the material. These fluids are reversible since, when the stress is stopped, the material becomes restructured and regains its initial viscoelastic characteristics. This behavior is very useful in practical applications as a fluid will have a high viscosity upon standing on the shelf and be less susceptible to separation and settling but will be easy to handle when shaken or pumped.

In embodiments, the liquid carrier comprises a fertilizer. In embodiments, the liquid carrier is water. In embodiments, the liquid carrier comprises micronutrients. In embodiments the liquid carrier comprises a mixture of fertilizer and micronutrients.

In embodiments, fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-60:0-60:0-60, with the proviso that at least one of the values of the nitrogen, phosphorus, or potassium source is not zero.

In embodiments, the nitrogen source is selected from the group comprising but not limited to ammonia, urea, urea phosphate, thiourea, ammonium sulfate, ammonium nitrate, potassium nitrate, ammonium phosphate, ammonium polyphosphate, ammonium chloride, diammonium phosphate (DAP), urea triazone, amino acids, aromatic nitrogen or heterocyclic nitrogen compounds, hexamethylene tetraamine, melamine, nitrobenzene, and mixtures thereof.

In embodiments, the phosphorous source is selected from the group comprising but not limited to phosphate salts, phosphite salts, calcium phosphate, nitro phosphate, potassium phosphate, mono ammonium phosphate, di-ammonium phosphate, triple super phosphate, phosphoric acid, phosphorous acid, polyphosphoric acid, HEDP (1-hydroxyethane 1,1-diphosphonic acid), AMP (Adenosine monophosphate), amino-tris(methylenephosphonic acid), phosphorous pentoxide, and mixtures thereof.

In embodiments, the potassium source is selected from the group comprising but not limited to potassium sulfate, potassium phosphate, potassium oxide, potassium hydroxide, potassium chloride, potassium nitrate, potassium carbonate, potassium bicarbonate, potassium magnesium sulfate, and mixtures thereof.

In embodiments, the medium having a high ionic strength comprises an agriculturally active ingredient as a salt.

In embodiments, the medium having a high ionic strength comprises a surfactant. In embodiments, the surfactant is a cationic surfactant. In embodiments, the surfactant is an anionic surfactant. In embodiments, the surfactant is a zwitterionic surfactant. In embodiments the surfactant is a polymeric or a non-ionic surfactant.

In embodiments, the microfibrillated cellulose is present in the adjuvant composition at a concentration of from about 0.01% by weight to 5% by weight of dry microfibrillated cellulose. This percentage is a dry weight basis, as defined hereinabove. In embodiments, the microfibrillated cellulose is present in a concentration from about 0.01% to about 4%. In embodiments, the microfibrillated cellulose is present in a concentration from about 0.01% to about 3%. In embodiments, the microfibrillated cellulose is present in a concentration from about 0.01% to about 2%. In embodiments, the microfibrillated cellulose is present in a concentration from about 0.01% to about 1%. In embodiments, the dry weight basis of MFC is no more than about 1%. In embodiments, the dry weight basis of MFC is no more than about 0.5%. In embodiments, the dry weight basis of MFC is no more than about 0.1%. In embodiments, the dry weight basis of MFC is no more than about 0.05%.

Surfactants are surface-active agents that lower surface tension and may increase solubility of an active ingredient in a solution and thereby may increase the emulsifying, foaming, dispersing, spreading and wetting properties of a product. A surfactant may be anionic, nonionic, cationic, and/or amphoteric. Examples of surfactant include those discloses in Mariano et al. "Surfactants in Agriculture" (Chapter 7)(pp. 287-334)(2013) from book "Green Materials for Energy, Products and Depollution, Environmental Chemistry for a Sustainable World 3, DOI 10.1007/978-94-007-6836-9_7. https://www.researchgate.net/publication/299681827_Surfactants_in_Agriculture.

Suitable anionic surfactants include alkali, alkaline earth or ammonium salts of sulfonates, sulfates, phosphates, carboxylates, and mixtures thereof. Examples of sulfonates include alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable non-ionic surfactants include alkoxylates, N-substituted fatty acid amides, amine oxides, esters, sugar-based surfactants, polymeric surfactants, and mixtures thereof. Examples of alkoxylates include alcohols, alkylphenols, amines, amides, arylphenols, fatty acids or fatty acid esters having from 1 to 40 alkoxy units, for example, ethoxylated fatty acids, alcohol ethoxylates, tristyrylphenol ethoxylates, ethoxylated sorbitan fatty acid esters or mixtures thereof. Ethoxylated fatty acids include castor or canola oil ethoxylates having at least 25, or from 27 to 37 ethoxy units, such as Sunaptol® CA350 (castor oil ethoxylate with 35 ethoxy units) of Uniqema (formerly ICI Surfactants), Mergital® EL33 (castor oil ethoxylate with 33 ethoxy units) of Henkel KGaA, Eumulgin® C03373 (canola oil ethoxylate with 30 ethoxy units) of Henkel KGaA and Ukanil® 2507 (castor oil ethoxylate) of Uniqema. Other examples of non-ionic surfactants include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, Poloxamer® (triblock copolymer of polyoxyethylene, followed by a block of polyoxypropylene, followed by a block of polyoxyethylene) 401, stearoyl monoisopropanolamide, and polyoxyethylene hydrogenated tallow amid Suitable cationic surfactants include quaternary surfactants, for example quaternary ammonium compounds with one or two hydrophobic groups, or salts of long-chain primary amines. Suitable amphoteric surfactants include alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Amphoteric surfactants have both charges and may vary their charge with changes in pH. Examples suitable amphoteric surfactants include sodium N-dodecyl-.beta.-alanine, sodium N-lauryl-3-iminodipropionate, myristoamphoacetate, lauryl betaine and lauryl sulfobetaine.

In embodiments, the surfactant or dispersant are present in an amount from about 0.01% to 95%, 0.01% to 50%, 0.01% to 5% of the adjuvant composition.

In embodiments, there are provided adjuvant compositions made by the process of subjecting to a shear force a mixture comprising a microfibrillated cellulose, a surfactant or dispersant, and a liquid carrier.

In embodiments, there are provided adjuvant compositions comprising a microfibrillated cellulose, a surfactant or dispersant and a fertilizer, wherein the adjuvant composition is formed by subjecting the microfibrillated cellulose, the surfactant or dispersant, and the fertilizer to shear conditions.

In embodiments, adjuvant compositions may employ any of the surfactants (wetting agents) or dispersants disclosed herein. These may include anionic, cationic, zwitterionic, non-ionic, including polymeric types, and combinations thereof.

In embodiments, there are provided methods comprising forming a mixture comprising a microfibrillated cellulose, a surfactant or dispersant and a liquid carrier, and subjecting the mixture to shear force conditions. In embodiments, methods provide that the liquid carrier is a fertilizer.

In embodiments, there are provided compositions comprising a formulation of an agriculturally active compound and an adjuvant composition comprising a microfibrillated cellulose, a surfactant or dispersant and a liquid carrier, wherein the adjuvant composition is formed by subjecting the microfibrillated cellulose, the surfactant or dispersant, and the liquid carrier to shear conditions.

In embodiments, the formulation of an agriculturally active compound comprises a capsule suspension. In embodiments, the formulation comprises a microemulsion. In embodiments, the formulation comprises a suspension concentrate. In embodiments, the formulation comprises solid particles of the agriculturally active ingredient. In embodiments, the solid particles are wettable powders.

The adjuvant compositions of the present disclosure may be capable to create rheological structure in a composition having a high pH value (e.g., as high as pH 12) or a low pH value (e.g., as low as pH 1), when being included in the composition. The adjuvant compositions of the present disclosure may be capable to create rheological structure in a composition having a high solid content (e.g., having a solid content of from about 1% by weight to about 80% by weight of the total weight of the composition), when being included in the composition. The adjuvant composition of the present disclosure may be capable to create rheological structure in a composition having a high electrolyte content or multivalent cations, or cationic surfactants. Each of these conditions highlight a benefit of the MFC rheology modifier over conventional polysaccharide-based agents such as xanthan gum and guar gum, which generally fail to perform in such compositions.

In embodiments, the agriculturally active compound comprises at least one of a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, and a micronutrient.

In embodiments, the agriculturally active ingredient comprises at least one of a virucide, a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, a piscicide, an avicide, a rodenticide, an antifeedant, a chemosterilant, and a micronutrient. In embodiments, the agriculturally active ingredient comprises at least one of a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, and a micronutrient. In embodiments, the agriculturally active ingredient comprises a virucide. In embodiments, the agriculturally active ingredient comprises a pesticide. In embodiments, the agriculturally active ingredient comprises a bactericide. In embodiments, the agriculturally active ingredient comprises an algaecide. In embodiments, the agriculturally active ingredient comprises a nematicide. In embodiments, the agriculturally active ingredient comprises a fungicide. In embodiments, the agriculturally active ingredient comprises a larvicide. In embodiments, the agriculturally active ingredient comprises an insecticide. In embodiments, the agriculturally active ingredient comprises an herbicide. In embodiments, the agriculturally active ingredient comprises an herbicide safener. In embodiments, the agriculturally active ingredient comprises a plant growth regulator. In embodiments, the agriculturally active ingredient comprises a plant activator. In embodiments, the agriculturally active ingredient comprises a synergist. In embodiments, the agriculturally active ingredient comprises an acaricide. In embodiments, the agriculturally active ingredient comprises a molluscicide. In embodiments, the agriculturally active ingredient comprises a repellant. In embodiments, the agriculturally active ingredient comprises a piscicide. In embodiments, the agriculturally active ingredient comprises an avicide. In embodiments, the agriculturally active ingredient comprises a rodenticide. In embodiments, the agriculturally active ingredient comprises an antifeedant. In embodiments, the agriculturally active ingredient comprises a chemosterilant. In embodiments, the agriculturally active ingredient comprises a micronutrient.

In embodiments, the virucide is imanin or ribavirin.

In embodiments, the bactericide is bronopol, copper hydroxide, cresol, dichlorophen, dipyrithione, dodicin, fenaminosulf, formaldehyde, hydrargaphen, 8-hydroxyquinoline sulfate, kasugamycin, nitrapyrin, octhilinone, oxolinic acid, oxytetracycline, probenazole, streptomycin, tecloftalam, or thiomersal.

In embodiments, the nematicide is an antibiotic nematicide (e.g., abamectin (AVID®), a carbamate nematicide (e.g., benomyl, carbofuran, carbosulfan, cloethocarb, oxime carbamate nematicides, alanycarb, aldicarb, aldoxycarb, or oxamyl), an organophosphorus nematicide (e.g., diamidafos, fenamiphos, fosthietan, phosphamidon, cadusafos, chlorpyrifos, dichlofenthion, dimethoate, ethoprophos, fensulfothion, fosthiazate, heterophos, isamidofos, isazofos, mecarphon, phorate, phosphocarb, terbufos, thionazin, or triazophos), acetoprole, benclothiaz, chloropicrin, dazomet, 1,2-dibromo-3-chloropropane (DBCP), dichlorophenolindophenol (DCIP), 1,2-dichloropropane, 1,3-dichloropropene, furfural, iodomethane, metam, methyl bromide, methyl isothiocyanate, or xylenols.

In embodiments, the algaecide is a bromine compound (e.g., AGRIBROM®), bethoxazin (3-benzo[b]thien-2-yl-5,6-dihydro-1,4,2-oxathiazine 4-oxide), copper sulfate, cybutryne (N-cyclopropyl-N-(1,1-dimethylethyl)-6-(methylthio)-1,3,5-triazine-2,4-diamine), dichlon (2,3-dichloro-1,4-naphthoquinone), dichlorophen (2,2-methylenebis[4-chlorophenol] or 4,4-dichloro-2,2-methylenediphenol), endothal, fentin (triphenyltin, triphenylstannylium, or fenolovo), hydrated lime (calcium hydroxide), nabam, quinoclamine (2-amino-3-chloro-1,4-naphthoquinone or ACN), quinonamid (2,2-dichloro-N-(3-chloro-1,4-naphthoquinon-2-yl)acetamide), or simazine.

In embodiments, the fungicide is an aliphatic nitrogen fungicide (e.g., butylamine, cymoxanil, dodicin, dodine, guazatine, or iminoctadine), an amide fungicide (e.g., carpropamid, chloraniformethan, cyazofamid, cyflufenamid, diclocymet, ethaboxam, fenoxanil, flumetover, furametpyr, penthiopyrad, prochloraz, quinazamid, silthiofam, triforine, benalaxyl (e.g., benalaxyl-M), furalaxyl, metalaxyl (RIDOMIL®, SUBDUE®) (e.g., metalaxyl-M), pefurazoate, benzamide fungicides (e.g., benzohydroxamic acid, fluopicolide, tioxymid, trichlamide, zarilamid, or zoxamide), furamide fungicides (e.g., cyclafuramid, furmecyclox), phenylsulfamide fungicides (e.g., dichlofluanid, tolylfluanid), valinamide fungicides (e.g., benthiavalicarb, iprovalicarb), anilide fungicides (e.g., benalaxyl (e.g., benalaxyl-M), boscalid, carboxin (VITAVAX®), fenhexamid, metalaxyl (e.g., metalaxyl-M), metsulfovax, ofurace, oxadixyl, oxycarboxin, pyracarbolid, thifluzamide, or tiadinil), benzanilide fungicides (e.g., benodanil, flutolanil, mebenil, mepronil, salicylanilide, or tecloftalam), furanilide fungicides (e.g., fenfuram, furalaxyl, furcarbanil, or methfuroxam), or sulfonanilide fungicides (e.g., flusulfamide)), an antibiotic fungicide (e.g., aureofungin, blasticidin-S, cycloheximide, griseofulvin, kasugamycin, natamycin, polyoxins, polyoxorim, streptomycin, validamycin, or strobilurin fungicides (e.g., azoxystrobin, dimoxystrobin, fluoxastrobin, kresoxim-methyl, metominostrobin, orysastrobin, picoxystrobin, pyraclostrobin, or trifloxystrobin)), an aromatic fungicide (e.g., biphenyl, chlorodinitronaphthalene, chloroneb, chlorothalonil (BRAVO®, DACONIL 2787®, EXOTHERM®, TERMIL®), cresol, dicloran, chlorobenzoles (e.g., hexachlorobenzene (HCB), pentachloronitrobenzene (PCNB) (TERRACLOR®)), pentachlorophenol (penta) (PCP) (DUROTOX®), quintozene, sodium pentachlorophenoxide, tecnazene, or tribromophenol), a benzimidazole fungicide (e.g., benomyl, carbendazim, chlorfenazole, cypendazole, debacarb, fuberidazole, mecarbinzid, rabenzazole, or thiabendazole), a benzimidazole precursor fungicide (e.g., furophanate, thiophanate, or thiophanate-methyl), a benzothioazole fungicide (e.g., bentaluron, chlobenthiazone, or (benzothiazol-2-ylthio)methyl thiocyanate (TCMTB)), a bridged diphenyl fungicide (e.g., bithionol, dichlorophen, or diphenylamine), a carbamate fungicide (e.g., benthiavalicarb, furophanate, iprovalicarb, propamocarb, thiophanate, thiophanate-methyl (CLEARY 3336®, EASOUT®), benomyl, carbendazim, cypendazole, debacarb, mecarbinzid, or diethofencarb), a conazole fungicide (e.g., climbazole, clotrimazole, imazalil, oxpoconazole, prochloraz, triflumizole, azaconazole, bromuconazole, cyproconazole, diclobutrazol, difenoconazole, diniconazole (e.g., diniconazole-M), epoxiconazole, etaconazole, fenbuconazole, fluquinconazole, flusilazole, flutriafol, furconazole (e.g., furconazole-cis), hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, or uniconazole (e.g., uniconazole-P)), a copper fungicide (e.g., Bordeaux mixture (i.e., copper sulfate/copper(II) tetraoxosulfate/cupric sulfate (CuSO4) (1-2%)+calcium carbonate (CaCO3) or hydroxide with or without stailizing agents (CuSO4·3Cu(OH)2·3CaSO4)), Burgundy mixture (i.e., disodium carbonate+copper sulfate in water), Cheshunt mixture (i.e., copper(II) tetraoxosulfate and diammonium carbonate), copper acetate, copper carbonate (basic), copper hydroxide, copper naphthenate, copper oleate, copper oxychloride, copper sulfate, copper sulfate (basic), copper zinc chromate, cufraneb, cuprobam, cuprous oxide, mancopper, or oxine copper), a dicarboximide fungicide (e.g., famoxadone, fluoroimide, chlozolinate, dichlozoline, iprodione, isovaledione, myclozolin, procymidone, vinclozolin, captafol (DIFOLATAN®), captan (CAPTAN®), ditalimfos, folpet (FOLPAN®, PHALTAN®, THIOPHAL®), or thiochlorfenphim), a dinitrophenol fungicide/nitroderivative (e.g., binapacryl, dinobuton, dinocap (e.g., dinocap-4 or dinocap-6), dinocton, dinopenton, dinosulfon, dinoterbon, dinitro-ortho-cresol (DNOC), p-nonyl-dinitrophenol, or dinitrophenyl-nonyl-butyrate), a dithiocarbamate fungicide (e.g., dimethyldithiocarbamates (e.g., ferbam or ziram), ethylenebisdithiocarbamates (EBDC) (e.g., mancozeb (DITHANE®), maneb (MB)/manganese ethylene-bis-dithiocarbamate (Mn-EBDC), zineb, nabam/disodium ethylenebis(dithiocarbamate)/disodium 1,2-ethanediylbis(carbamodithioate)), or thiram (THIRAM®, TULISAN®)), propylenebisdithiocarbamates (e.g., propineb), azithiram, carbamorph, cufraneb, cuprobam, disulfiram, metam, tecoram, cyclic dithiocarbamate fungicides (e.g., dazomet, etem, or milneb), or polymeric dithiocarbamate fungicides (e.g., mancopper, metiram, polycarbamate, or propylenebisdithiocarbamates (e.g., propineb))), an imidazole fungicide (e.g., cyazofamid, fenamidone, fenapanil, glyodin, iprodione (CHIPCO26019®, ROVRAL®), isovaledione, pefurazoate, or triazoxide), an inorganic fungicide (e.g., potassium azide, potassium thiocyanate, sodium azide, sulfur fungicides (e.g., sulfur powder (SULPHUR-92%®), wettable sulphur, or lime Sulphur), mercury fungicides (e.g., mercuric chloride, mercuric oxide, mercurous chloride, agrosan GN, ceresan, semesan, perrugen, (3-ethoxypropyl)mercury bromide, ethylmercury acetate, ethylmercury bromide, ethylmercury chloride, ethylmercury 2,3-dihydroxypropyl mercaptide, ethylmercury phosphate, ethylmercury sulfate, N-(ethylmercury)-p-toluenesulphonanilide, hydrargaphen, 2-methoxyethylmercury chloride, methylmercury benzoate, methylmercury dicyandiamide, methylmercury pentachlorophenoxide, 8-phenylmercurioxyquinoline, phenylmercuriurea, phenylmercury acetate, phenylmercury chloride, phenylmercury derivative of pyrocatechol, phenylmercury nitrat, phenylmercury salicylate, thiomersal, or tolylmercury acetate), a morpholine fungicide (e.g., aldimorph, benzamorf, carbamorph, dimethomorph, dodemorph, fenpropimorph, flumorph, or tridemorph), an organophosphorus fungicide (e.g., ampropylfos, ditalimfos, edifenphos, fosetyl, hexylthiofos, iprobenfos, phosdiphen, pyrazophos, tolclofos-methyl, triamiphos, or tri-o-tolyl phosphate/tri-ortho cresyl phosphate (TOCP)), an organotin fungicide (e.g., decafentin, fentin, or tributyltin oxide), an oxathiin fungicide (e.g., carboxin or oxycarboxin), an oxazole fungicide (e.g., chlozolinate, dichlozoline, drazoxolon, famoxadone, hymexazol, metazoxolon, myclozolin, oxadixyl, or vinclozolin), a polysulfide fungicide (e.g., barium polysulfide, calcium polysulfide, potassium polysulfide, or sodium polysulfide), a pyrazole fungicide (e.g., furametpyr or penthiopyrad), a pyridine fungicide (e.g., boscalid, buthiobate, dipyrithione, fluazinam, fluopicolide, pyridinitril, pyrifenox, pyroxychlor, or pyroxyfur), a pyrimidine fungicide (e.g., bupirimate, cyprodinil, diflumetorim, dimethirimol, ethirimol, fenarimol, ferimzone, mepanipyrim, nuarimol, pyrimethanil, or triarimol), a pyrrole fungicide (e.g., fenpiclonil, fludioxonil, or fluoroimide), a quinoline fungicide (e.g., ethoxyquin or halacrinate), an 8-hydroxyquinoline sulfate (e.g., quinacetol or quinoxyfen), a quinone fungicide (e.g., benquinox, chloranil, dichlone, or dithianon), a quinolone, a quinoxaline fungicide (e.g., chinomethionat, chlorquinox, or thioquinox), a thiazole fungicide (e.g., ethaboxam, etridiazole (TRUBAN®), metsulfovax, octhilinone, thiabendazole, thiadifluor, or thifluzamide), a thiocarbamate fungicide (e.g., methasulfocarb or prothiocarb), a thiophene fungicide (e.g., ethaboxam or silthiofam), a triazine fungicide (e.g., anilazine, triazole fungicides, bitertanol, fluotrimazole, or triazbutil), a urea fungicide (e.g., bentaluron, pencycuron, or quinazamid), a systemic fungicide (e.g., oxathin derivatives (e.g., plantvax or vitavax), demosan, or bavistin), acibenzolar, acypetacs, allyl alcohol, benzalkonium chloride, benzamacril, bethoxazin, carvone, chloropicrin, 1,2-dibromo-3-chloropropane (DBCP), dehydroacetic acid, diclomezine, diethyl pyrocarbonate, fenaminosulf (LESAN®), fenitropan, fenpropidin, formaldehyde, furfural, hexachlorobutadiene, iodomethane, isoprothiolane, methyl bromide, methyl isothiocyanate, metrafenone, nitrostyrene, nitrothal-isopropyl, OCH, 2-phenylphenol, phthalide, piperalin, probenazole, proquinazid, pyroquilon, sodium orthophenylphenoxide, spiroxamine, sultropen, thicyofen, tricyclazole, zinc naphthenate, malachite green, or efosite-Al (ALIETTE®).

In embodiments, the herbicide is copper sulfate (CuSO4), sulfuric acid (H2SO4), sodium chlorate (NaClO3), ammonium sulfamate (NH4SO3NH2), borax, calcium chlorate, ferrous sulfate, potassium azide, potassium cyanate sodium azide, an aliphatic or halo-aliphatic acid (e.g., dalapon/2,2-dichloro propionic acid (DOWPON®, TAFAPON®) or trichloro acetic acid (TCA) (VARITOX®)), an amide herbicide (e.g., allidochlor/N,N-diallyl-2-chloro acetamide (CDAA) (RANDOX®), beflubutamid, benzadox, benzipram, bromobutide, cafenstrole, 2-chloro-N,N-diethylacetamide (CDEA), chlorthiamid, cyprazole, dimethenamid (e.g., dimethenamid-P), diphenamid, epronaz, etnipromid, fentrazamide, flupoxam, fomesafen, halosafen, isocarbamid, isoxaben, napropamide, naptalam/N-1-naphthyohthalamic acid (ALANAP®), penoxsulam, pethoxamid, propyzamide, quinonamid, tebutam, or anilide herbicides (e.g., chloranocryl, cisanilide, clomeprop, cypromid, diflufenican, etobenzanid, fenasulam, flufenacet, flufenican, mefenacet, mefluidide, metamifop, monalide, napronalide, pentanochlor, picolinafen, propanil/3,4-dichloro propionanilide (STAM F-34®, ROGUE®), benzoylprop, flamprop (e.g., flamprop-M), acetochlor, alachlor/2-chloro-2,6-diethyl-N-(methoxymethyl)-acetanilide (LASSO®), butachlor/N-(butoxymethyl)-2-chloro-2', c' ethyl acetanilide (Machete®), butenachlor, delachlor, diethatyl, dimethachlor, metazachlor, metolachlor (e.g., S-metolachlor), pretilachlor, propachlor/2-chloro-N-isopropyl acetanilide (RAMROD®), propisochlor, prynachlor, terbuchlor, thenylchlor, xylachlor, benzofluor, cloransulam, diclosulam, florasulam, flumetsulam, metosulam, perfluidone, profluazol, or pronamide/3,5-dichloro (N-1,1-dimethyl-2-propynyl) benzamide (KERB®))), an acryldehyde (e.g., acrolein/2-propanol or acryl aldihide (AQALIN®)), an aromatic acid herbicide (e.g., benzoic acid herbicides (e.g., chloramben, dicamba, 2,3,6-trichlorobenzoic acid (2,3,6-TBA), or tricamba), pyrimidinyloxybenzoic acid herbicides (e.g., bispyribac or pyriminobac), pyrimidinylthiobenzoic acid herbicides (e.g., pyrithiobac), phthalic acid herbicides (e.g., chlorthal), picolinic acid herbicides (e.g., aminopyralid, clopyralid, or picloram), or quinolinecarboxylic acid herbicides (e.g., quinclorac or quinmerac)), an aniline or nitro-phenol (e.g., dinitamine/2,6-dinitro-3,amino-4-tri-fluoromethyl-N,N-diethyl-aniline (COBEX®), nitralin/4-(methyl-sulphonyl)-2, 6-dinitro-N,N-dipropyniline (PLANAVIN®), penexalin/N-(ethyl propyl)-3,4-dimethyl-2,6-dinitrobenzamine (STOMP®), trifluralin/2,6-dinitro-N,N-dipropyl-4-trifluron methylaniline (TREFLAN®), fluchlorlin/N-propyl-N-(2'chloroethyl)-2,6-dintro-trifluroin-ethyl-aniline (BASA-LIN®), 2-methyl-4,6-dinitrophenol/dinitroorthocresol (DNOC) (SINOX®), dinoseb/4,6-dinitro-2-5-butyl phenol (DOW-WEED KILLER®), pentachlorophenol, nitrofen/2, 4-dinitro-4-trifluoro-methyl-diphenyl-ether (TOK E-25®)), an arsenical herbicide (e.g., cacodylic acid, CMA, hexaflurate, MAMA, potassium arsenite, sodium arsenite, disodium methyl arsenate (DSMA) (ANSER 184®), methane arsenic acid (MAA) (ANSAR®), monosodium methyl arsenate (MSMA) (Anser-529®), calcium arsenate or orthoarsenate/tricalcium arsenate or orthoarsenate (CaHAsO4), lead arsenate (PbHAsO4), or dimethylarsonate), antibiotic herbicides (e.g., bilanafos), benzoic and phenyl acetic acid (e.g., chloramben/3-amino-2,5-dichlorobenzoic acid (Amiben, VEGIBEN®), dicamba/2-methoxy-3,6-dichlorobenzoic acid (BANVEL-D®), fenac/2,3,6-trichlorophenyl acetic acid (FENAC®), or oxyfluorfen/2-chloro-1-(3-ethoxy-4-nitro phenoxy)-4-(trifluormethyl) benzene (GOAL®)), a benzoylcyclohexanedione herbicide (e.g., mesotrione or sulcotrione), a benzofuranyl alkylsulfonate herbicide (e.g., benfuresate or ethofumesate), a carbamate herbicide (e.g., carboxazole, chlorprocarb, dichlormate/3,4-dichlorobenzyl methyl carbamate (SIRMATE®), asulam/methyl sulfanilyl carbamate (AUSLOX®), fenasulam, karbutilate, or terbucarb), a carbanilate herbicide (e.g., barban/4-chloro-2-butynyl m-chloro-carbanilate (CARBYNe®), 1-methylpropyl C-(3-chlorophenyl)carbamate (BCPC), carbasulam, carbetamide, 2-chloroethyl N-(3-chlorophenyl)carbamate (CEPC), chlorbufam, chlorprophan/isopropyl m-chloro carbanilate (CIPC®), 2-chloro-1-methylethyl N-(3-chlorophenyl)carbamate (CPPC), desmedipham, phenisopham, phenmedipham, phenmedipham-ethyl, propham/isopropyl carbanilate (IPC®), or SWEP/3,4-dichloro carbonilate (METHYL®)), a cyclohexene oxime herbicide (e.g., alloxydim, butroxydim, clethodim, cloproxydim, cycloxydim, profoxydim, sethoxydim, tepraloxydim, or tralkoxydim), a cyclopropylisoxazole herbicide (e.g., isoxachlortole or isoxaflutole), a dicarboximide herbicide (e.g., benzfendizone, cinidon-ethyl, flumezin, flumiclorac, flumioxazin, or flumipropyn), a dinitroaniline herbicide (e.g., benfluralin, butralin, dinitramine, ethalfluralin, fluchloralin, isopropalin, methalpropalin, nitralin, oryzalin, pendimethalin, prodiamine, profluralin, or trifluralin), a dinitrophenol herbicide (e.g., dinofenate, dinoprop, dinosam, dinoseb, dinoterb, 2-methyl-4,6-dinitrophenol/dinitro-o-cresol (DNOC) (SINOX®), etinofen, or medinoterb), a diphenyl ether herbicide (e.g., ethoxyfen or nitrophenyl ether herbicides (e.g., acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen, or oxyfluorfen)), a dithiocarbamate herbicide (e.g., dazomet or metam), a halogenated aliphatic herbicide (e.g., alorac, chloropon, dalapon, flupropanate, hexachloroacetone, iodomethane, methyl bromide, monochloroacetic acid, SMA, or trichloroacetic acid (TCA)), an imidazolinone herbicide (e.g., imazamethabenz, imazamox, imazapic, imazapyr, imazaquin, or imazethapyr), a nitrile herbicide (e.g., bromobonil, bromoxynil/4-hydroxy-3,5-dibromo benzonitrile (BUCTRIL®), chloroxynil, dichlobenil/ 2,6-dichlorobenzonitrile (CASORON®), iodonobil, ioxynil/ 4-hydroxy-3-5-di-iodobenzonitrile (ACTRIL®), or pyraclonil), an organophosphorus herbicide (e.g., amiprofos-methyl, anilofos, bensulide, bilanafos, butamifos, 2,4-DEP, O-(2,4-dichlorophenyl) O-methyl (1-methylethyl) phosphoramidothioate (DMPA), ethyl (P,P)-bis(2-ethylhexyl)phosphinate (EBEP), fosamine, phosphonomethyl amino acids/glycine derivatives (e.g., glyphosate/glycine phosphonate (ROUND-UP®) or N-(phosphonomethyl)-glycine/glufosinate), or piperophos)), a phenoxy herbicide (e.g., bromofenoxim, clomeprop, 2,4-DEB, 2,4-DEP/tris(2-(2-4-dichlorophenoxy) ethyl sulfate (FALONE®), 2,4-DES/sodium,2-(2-4-dichlorophenoxy) ethyl sulfate (SESONE®), difenopenten, disul, erbon, etnipromid, fenteracol, trifopsime, 2-(4-chlorophenoxy)acetic acid (4-CPA), 2,4-dichlorophenoxyacetic acid (2,4-D) (ETHYL ESTER®), 3,4-DA, 2-methyl-4-chlorophenoxyacetic acid (MCPA) (ACME MCPA AMINE 4®, AGRITOX®, AGRO ONE®, BORDERMASTER®, BH, MCPA®, CHIPTOX®, DED-WEED®, EMPAL®, KILSEM®, MEPHANAL®, METHOXONE®, PHOMENE®, RHONOX®, and WEEDAR®), S-ethyl 2-(4-chloro-2-methylphenoxy)ethanethioate (MCPA-thioethyl), or 2,4,5-trichlorophenoxyacetic acid (2,4,5-T) (BRUSH KILLER®) (often contaminated with 2,3,7,8-tetrachlorodibenzo-p-dioxin (TCDD)), Agent Blue, Agent Green, Agent Orange, Agent Pink, Agent Purple, Agent White, dinxol, trinoxol, bromacil, diquat, tandex, monuron, diuron, dalapon, a phenoxybutyric herbicide (e.g., 4-(4-chlorophenoxy)butanoic acid (4-CPB), (2,4-dichloro phenoxy) butyric acid (2,4-DB) (BUTAXONE®), 3,4-DB, 4-chloro-2-methyl-phenoxy) butyric acid (MCPB) (TROPOTOX®), or 4-(2,4,5-trichlorophenoxy)butanoic acid (2,4,5-TB)), an α-phenoxypropionic herbicide (e.g., silvex/2(2,4,5-trichlorophenoxy) propionic acid (WEEDONE®), 2-(4-chlorophenoxy)propanoic acid (4-CPP), dichlorprop/α-(2,4-dichloro-phenoxy) propionic acid (2,4-DP®) (e.g., dichlorprop-P), 3,4-DP, fenoprop, or mecoprop/(4-chloro-2-methyl phenoxy) propionic acid (MCPP®) (e.g., mecoprop-P)), an aryloxyphenoxypropionic herbicide (e.g., chlorazifop, clodinafop, clofop, cyhalofop, diclofop, fenoxaprop (e.g., fenoxaprop-P), fenthiaprop, fluazifop (e.g., fluazifop-P), haloxyfop (e.g., haloxyfop-P), isoxapyrifop, metamifop, propaquizafop, quizalofop (e.g., quizalofop-P), or trifop), a phenylenediamine herbicide (e.g., dinitramine or prodiamine), a pyrazolyloxyacetophenone herbicide (e.g., benzofenap or pyrazoxyfen), a pyrazolylphenyl herbicide (e.g., fluazolate or pyraflufen), a pyridazine herbicide (e.g., credazine, pyridafol, pyridate, maleic hydrazide (MH)/1,2-dihydro pyridazine-3,6-dione (RETARD®)), a pyridazinone herbicide (e.g., brompyrazon, chloridazon, dimidazon, flufenpyr, metflurazon, norflurazon, oxapyrazon, or pydanon), a pyridine herbicide (e.g., aminopyralid, cliodinate, clopyralid, dithiopyr, fluroxypyr, haloxydine, picloram/4-amino-3,5,6-trichloro piclonic acid (TORDON®), picolinafen, pyriclor, thiazopyr, or triclopyr), a pyrimidinediamine herbicide (e.g., iprymidam or tioclorim), a quaternary ammonium herbicide (e.g., cyperquat, diethamquat, difenzoquat, morfamquat, diquat/1,1-ethyl-2,2 bipyridylium dibromide (REGLON®), or paraquat/1,1-dimethyl-4,4-bi-pyridylium dibromide (GRAMOXONE®)), a triazine herbicide (e.g., dipropetryn, triaziflam, trihydroxytriazine, chlorotriazine herbicides (e.g., atrazine/2-chloro-4-(ethyl amino)-6-(isopropyl amino)-S-triazine (ATRATAF®, RESI-DOX®), chlorazine, cyanazine, cyprazine, eglinazine, ipazine, mesoprazine, procyazine, proglinazine, propazine, sebuthylazine, simazine/2-chloro-4,6-bis-(ethyl amino)-S-triazine (GESATOP®), terbuthylazine, or trietazine), methoxytriazine herbicides (e.g., atraton, methometon, prometone/prometon/2,4-bis(isopropyl amino)-6-methoxy-S-triazine (PRAMITOL®), secbumeton, simeton, or terbumeton), or methylthiotriazine herbicides (e.g., ametryn/ ametryn/2-(ethyl amino)-4-(isopropyl-amino)-6-(methyl amino)-S-triazine (GESAPAX®), aziprotryne, cyanatryn, desmetryn, dimethametryn, methoprotryne, prometryn, simetryn, or terbutryn/terbutryne/2,4-bis(isopropyl amino)-6-methoxy-S-triazine (tert-butylamino)-4 (ethyl amino)-6-(methylthio)-S-triazine (IGRAN®)), a triazinone herbicide (e.g., ametridione, amibuzin, hexazinone, isomethiozin, metamitron, or metribuzin/4-amino-6-tert-butyl 3-(methylthio)-S-triazine-5(4H) one (SENCOR®)), a triazole herbicide (e.g., amitrole/3-amino-1,2,4-triazole (WEEDA-ZOL®), cafenstrole, epronaz, or flupoxam), a triazolone herbicide (e.g., amicarbazone, carfentrazone, flucarbazone, propoxycarbazone, or sulfentrazone), a triazolopyrimidine herbicide (e.g., cloransulam, diclosulam, florasulam, flumetsulam, metosulam, penoxsulam, uracil herbicides, butafenacil, flupropacil, isocil, lenacil, bromacil/5-bromo-6-methyl 1 3,5-butyl uracil (HYVAR-X®), or terbacil/5-chloro-6-methyl 3-T butyl uracil (SINBAR®)), aminotriazole, amitrole/3-amino-1,2,4-triazole (WEEDAZOL®), endothal/3, 6-endoxohexa hydrophthalic acid/7-oxabicyclo[2.2.1] heptane-2,3-dicarboxylic acid (ENDOTHALL®), oxadiazon/2-butyl-4-(2-,4-dichloro-5-isopropyl-1,3,4-oxadiazolin 5 oneoxyphenol) (RONSTAR®), or pyrazon/5-amino-4-chloro-2-phenyl 3 (2H) pyridazinone (PYRA-MIN®)), a thiocarbamate herbicide (e.g., butylate, cycloate, diallate/S-(2,3-dichloro allyl) diisopropylthiocarbamate (AVADEX®), S-ethyldipropylthiocarbamate (EPTC) (EPTAM®), esprocarb, ethiolate, isopolinate, methiobencarb, molinate/S-ethyl hexahydro-I H-azapine 1-carbothionate (ORDAM-72®), orbencarb, pebulate, prosulfocarb, pyributicarb, sulfallate, thiobencarb, tiocarbazil, triallate/S-(2,3,3-trichloro allyl) diisopropylthiocarbamate (AVADEX BW®), vernolate (e.g., benthiocarb/S-(4-chlorobenzyl)-N, N-diethyl thio-carbamate (SATURN®, BOLERO®), 2-chloro allyl diethyl dithiocarbamate (CDEC) (VEGA-DEX®), bentazon/bentazone/3-isopropyl-2,1,3-benzo-thiadiazon-4-one-2,2-dioxide (BESAGRAN BSA-3510®), or parathion), a thiocarbonate herbicide (e.g., dimexano, thioperoxydicarbonic acid diethyl ester (EXD), or proxan), a substituted urea herbicide (e.g., benzthiazuron, cumyluron, cycluron, dichloralurea, diflufenzopyr, isonoruron, isouron, methabenzthiazuron, monisouron, noruron, methiuron, anisuron, buturon, linuron/3-(3,4-dichloro phenyl)-1,methoxy- 1-methyl urea (LOROX®), chlorbromuron/3-(4-bromo-3-chlorophenyl)-1-methoxy-1-methyl urea (BROMEX®), chloreturon, chlorotoluron, chlorosulfuron, chloroxuron/3-(p-(p-chlorophenoxy) phenyl) 1,1-dimethyl urea (TENORON®), diuron/3-(3,4-dichlorophenyl) dimethyl urea (KARMEX®), fenuron TCA/1,1-dimethyl-3-phenyl-ureamon (trichloro acetate) (URAB®), fluometuron/1,1-dimethyl-3-(a,a,a-trifluoro m-tolyl) urea (COTORON®), monuron/3(p-chlorphenyl)-1,1-dimethylurea (TELVAR®), neburon/3,4-dichlorophenyl butyl, methyl urea (BONUS®), daimuron, difenoxuron, dimefuron, fluothiuron, isoproturon, methiuron, methyldymron, metobenzuron, metobromuron, metoxuron, monolinuron, parafluron, phenobenzuron, siduron, tetrafluron, thidiazuron, amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, oxasulfuron, primisulfuron, pyrazosulfuron, rimsulfuron, sulfometuron, sulfosulfuron, trifloxysulfuron, chlorsulfuron, cinosulfuron, ethametsulfuron, iodosulfuron, metsulfuron, prosulfuron, thifensulfuron, triasulfuron, tribenuron, triflusulfuron, tritosulfuron, buthiuron, ethidimuron, tebuthiuron, thiazafluron, or thidiazuron), C-288-methazole/2-(3,4-dichlorophenyl)-4-methyl-1,2,4-oxadiazolidine-3,5-dione (PROBE®), perfluidone/4-(phenyl sulphonyl)-1,1,1-trifluromethyl sulphono-o-toluidide (DESTUN®), fosmidomycin, acrolein, allyl alcohol, azafenidin, benazolin, benzobicyclon, buthidazole, calcium cyanamide (CaCN2) (DORMEX®), cambendichlor, chlorfenac, chlorfenprop, chlorflurazole, chlorflurenol, cinmethylin, clomazone, 1-chloro-N'-(3,4-dichlorophenyl)-N,N-dimethyl-methanimidamide (CPMF), cresol, ortho-dichlorobenzene, dimepiperate, fluoromidine, fluridone, flurochloridone, flurtamone, fluthiacet, indanofan, methyl isothiocyanate, nipyraclofen, OCH, oxadiargyl, oxaziclomefone, pentachlorophenol, pentoxazone, phenylmercury acetate, pinoxaden, prosulfalin, pyrazolynate, pyribenzoxim, pyriftalid, quinoclamine, rhodethanil, sulglycapin, thidiazimin, tridiphane, trimeturon, tripropindan, or tritac.

In embodiments, the herbicide safener is benoxacor, cloquintocet, cyometrinil, dichlormid, dicyclonon, diethalate, fenchlorazole, fenclorim, flurazole, fluxofenim, furilazole, isoxadifen, mefenpyr, mephenate, naphthalic anhydride, or oxabetrinil.

In embodiments, the plant activator is acibenzolar or probenazole.

In embodiments, the plant growth regulator is an anti-auxin (e.g., clofibric acid or 2,3,5-tri-iodobenzoic acid), an auxin (e.g., 2-(4-chlorophenoxy)acetic acid (4-CPA), 2,4-dichlorophenoxyacetic acid (2,4-D), 4-(2,4-dichlorophenoxy)butyric acid (2,4-DB), 2,4-DEP, dichlorprop, fenoprop, indole-3-acetic acid (IAA), indole-3-butyric acid (IBA), naphthaleneacetamide, α-naphthaleneacetic acid, 1-naphthol, naphthoxyacetic acid, potassium naphthenate, sodium naphthenate, or 2,4,5-trichlorophenoxyacetic acid (2,4,5-T)), cytokinins (e.g., 2iP, benzyladenine, kinetin, or zeatin), defoliants (e.g., calcium cyanamide, dimethipin, endothal, ethephon, metoxuron, pentachlorophenol, thidiazuron, or tribufos), ethylene inhibitors (e.g., aviglycine or 1-methylcyclopropene), ethylene releasers (e.g., 1-aminocyclopropane-1-carboxylic acid (ACC), etacelasil, ethephon, or glyoxime), gibberellins (e.g., gibberellic acid), growth inhibitors (e.g., abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat chloride, piproctanyl, prohydrojasmon, propham, 2,3,5-tri-iodobenzoic acid, morphactins (e.g., chlorfluren, chlorflurenol, dichlorflurenol, or flurenol), growth retardants (e.g., chlormequat chloride (CYCOCEL®), daminozide (B-NINE®), flurprimidol, mefluidide, paclobutrazol, tetcyclacis, or uniconazole), growth stimulators (e.g., brassinolide, forchlorfenuron, or hymexazol), benzofluor, buminafos, carvone, ciobutide, clofencet, cloxyfonac, cyclanilide, cycloheximide, epocholeone, ethychlozate, ethylene, fenridazon, heptopargil, holosulf, inabenfide, karetazan, lead arsenate, methasulfocarb, prohexadione, pydanon, sintofen, triapenthenol, or trinexapac.

In embodiments, the molluscicide is calcium arsenate, copper acetoarsenite (i.e., Paris green/pigment green 21/C4H6As6Cu4O16)), copper sulfate, N-bromoacetamide (C2H4BrNO), metaldehyde, niclosamide, pentachlorophenol, sodium pentachlorophenoxide, phenyl methylcarbamates (e.g., cloethocarb, methiocarb, tazimcarb, thiodicarb, or trimethacarb), organotin fungicides (e.g., triethyl tin oxide, tributyl tin oxide, triphenyl acetate tin, or fentin), or trifenmorph.

In embodiments, the insecticide is a muscacide, an ectoparasiticide/acaricide (e.g., antibiotic acaricides (e.g., nikkomycins, thuringiensin, macrocyclic lactone acaricides, tetranactin, avermectin acaricides (e.g., abamectin (AVID®), doramectin, eprinomectin, ivermectin, or selamectin), or milbemycin acaricides (e.g., milbemectin, milbemycin oxime, or moxidectin)), azobenzene, benzoximate, benzyl benzoate, bromopropylate, chlorbenside, chlorfenethol, chlorfenson, chlorfensulphide, chlorobenzilate, chloropropylat, dichlorodiphenyltrichloroethane (DDT), dicofol (KELTHANE®, MITIGAN®), diphenyl sulfone, dofenapyn, fenson, fentrifanil, fluorbenside, proclonol, tetradifon, tetrasul, benomyl (BENLATE®), carbanolate, carbaryl, carbofuran, methiocarb, metolcarb, promacyl, propoxur, aldicarb, butocarboxim, oxamyl, thiocarboxime, thiofanox, binapacryl, dinex, dinobuton, dinocap (e.g., dinocap-4 or dinocap-6), dinocton, dinopenton, dinosulfon, dinoterbon, 4,6-dinitro-o-cresol (DNOC), amitraz, chlordimeform, chloromebuform, formetanate, formparanate, mite growth regulators (e.g., clofentezine, diflovidazin, dofenapyn, fluazuron, flubenzimine, flucycloxuron, flufenoxuron, or hexythiazox), organochlorine acaricides (e.g., bromocyclen, camphechlor, DDT, dienochlor (PENTAC QQUAFLOW®), endosulfan, or lindane), organophosphorus acaricides (e.g., chlorfenvinphos, crotoxyphos, dichlorvos, heptenophos, mevinphos, monocrotophos, naled, schradan, tetraethyl pyrophosphate (TEPP), tetrachlorvinphos, amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton (e.g., demeton-O or demeton-S), demeton-methyl (e.g., demeton-O-methyl or demeton-S-methyl), demeton-S-methylsulphon, dialifos, diazinon, dimethoate, dioxathion, disulfoton, endothion, ethion, ethoate-methyl, formothion, malathion, mecarbam, methacrifos, omethoate, oxydeprofos, oxydisulfoton, parathion, phenkapton, phorate, phosalone, phosmet, phoxim, pirimiphos-methyl, prothidathion, prothoate, pyrimitate, quinalphos, quintiofos, sophamide, sulfotep, thiometon, triazophos, trifenofos, vamidothion, trichlorfon, isocarbophos, methamidophos, propetamphos, phosphorodiamide acaricides, dimefox, or mipafox), organotin acaricides (e.g., azocyclotin, cyhexatin (DOWCO 213®, PLICTRAN®), or fenbutatin-oxide (TORQUE®, VENDEX®)), dichlofluanid, dialifos, phosmet, acetoprole, fipronil, tebufenpyrad, vaniliprole, pyrethroid acaricides (e.g., acrinathrin, bifenthrin, cyhalothrin, cypermethrin (e.g., alpha-cypermethrin), fenpropathrin, fenvalerate, flucythrinate, flumethrin, fluvalinate (e.g., tau-fluvalinate), permethrin, or halfenprox), pyrimidifen, chlorfenapyr, chinomethionat, thioquinox, propargite, clofentezine, diflovidazin, spirodiclofen, fenothiocarb, chloromethiuron, diafenthiuron, acequinocyl, amidoflumet, arsenous oxide, bifenazate, closantel, crotamiton, disulfiram, etoxazole, fenazaflor, fenazaquin, fenpyroximate, fluacrypyrim, fluenetil, mesulfen, 2-fluoro-N-methyl-N-(1-naphthalenyl)acetamide (MNAF), nifluridide, pyridaben, sulfiram, sulfluramid, sulfur, or triarathene), an antibiotic insecticide (e.g., allosamidin, thuringiensin, macrocyclic lactone insecticides (e.g., spinosad), avermectin insecticides (e.g., abamectin (AVID®), doramectin, emamectin, eprinomectin, ivermectin, or selamectin), or milbemycin insecticides (e.g., milbemectin, milbemycin oxime, or moxidectin)), an arsenical insecticide/arsenical (e.g., calcium arsenate, copper acetoarsenite, copper arsenate, lead arsenate, potassium arsenite, or sodium arsenite), a carbamate insecticide/carbamate acetylcholinesterase (AChE) inhibitor (e.g., bendiocarb, carbaryl, benzofuranyl methylcarbamate insecticides (e.g., benfuracarb, carbofuran, carbosulfan, decarbofuran, or furathiocarb), dimethylcarbamate insecticides (e.g., dimetan, dimetilan, hyquincarb, or pirimicarb), oxime carbamate insecticides (e.g., alanycarb, aldicarb, aldoxycarb, butocarboxim, butoxycarboxim, methomyl, nitrilacarb, oxamyl (OXAMYL®), tazimcarb, thiocarboxime, thiodicarb, or thiofanox), phenyl methylcarbamate insecticides (e.g., allyxycarb, aminocarb, bufencarb, butacarb, carbanolate, cloethocarb, dicresyl, dioxacarb, 4-(ethylthio)phenyl N-methylcarbamate (EMPC), ethiofencarb, fenethacarb, fenobucarb, isoprocarb, methiocarb, metolcarb, mexacarbate, promacyl, promecarb, propoxur, trimethacarb, 3,5-dimethylphenyl N-methylcarbamate (XMC), or xylylcarb), a dinitrophenol insecticide (e.g., dinex, dinoprop, dinosam, or 2-methyl-4,6-dinitrophenol/dinitro-o-cresol (DNOC) (SINOX®)), a fluorine insecticide (e.g., fluosilicates (e.g., barium hexafluorosilicate or sodium hexafluorosilicate), cryolite, sodium fluoride, or sulfluramid), a formamidine insecticide (e.g., amitraz, chlordimeform, formetanate, or formparanate), a fumigant insecticide (e.g., acrylonitrile, carbon disulfide, carbon tetrachloride, chloroform, chloropicrin, p-dichlorobenzene1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride, or tetrachloroethane), an inorganic insecticide (e.g., borax, calcium polysulfide, copper oleate, mercurous chloride, potassium thiocyanate, or sodium thiocyanate), an insect growth regulator (e.g., chitin synthesis inhibitors (e.g., bistrifluron, buprofezin, chlorfluazuron, cyromazine, diflubenzuron, flucycloxuron, flufenoxuron, hexaflumuron, lufenuron, novaluron, noviflumuron, penfluron, teflubenzuron, or triflumuron), juvenile hormone mimics (e.g., epofenonane, fenoxycarb, hydroprene, kinoprene (ENSTAR®), methoprene, pyriproxyfen, or triprene), juvenile hormones (e.g., juvenile hormone I, juvenile hormone II, or juvenile hormone III), moulting hormone agonists (e.g., chromafenozide, halofenozide, methoxyfenozide, or tebufenozide), moulting hormones (e.g., ecdysone or ecdysterone), moulting inhibitors (e.g., diofenolan), precocenes (e.g., precocene I, precocene II, or precocene III), or dicyclanil), a nereistoxin analogue insecticide (e.g., bensultap, cartap, thiocyclam, or thiosultap), a nicotinoid insecticide (e.g., flonicamid, clothianidin, dinotefuran, imidacloprid, thiamethoxam, nitenpyram, nithiazine, acetamiprid, imidacloprid, nitenpyram, or thiacloprid), an organochlorine/chlorinated hydrocarbons insecticide (e.g., dichlorodiphenyltrichloroethane (DDT) (e.g., pp-DDT), bromo-DDT, camphechlor, dichlorodiphenyldichloroethane (ethyl-DDD), hexachlorocyclohexane (HCH) (e.g., gamma-HCH or lindane), methoxychlor, pentachlorophenol, dichlorodiphenyldichloroethane (TDE), cyclodiene insecticides (e.g., Aldrin, bromocyclen, chlorbicyclen, chlordane, chlordecone, dieldrin, dilor, endosulfan, endrin, 1,2,3,4,10,10-hexachloro-6,7-epoxy-1,4,4a,5,6,7,8,8a-octahydro-endo-1,4-exo-5,8-dimethanonaphthalene (HEOD), heptachlor, (1R,4S,4aS,5S,8R,8aR)-1,2,3,4,10,10-hexachloro-1,4,4a,5,8,8a-hexahydro-1,4:5,8-dimethanonaphthalene (HHDN), isobenzan, isodrin, kelevan, or mirex), voltage-gated Na+ channels inhibitors, or chlorinated cyclodienes GABAA antagonists), an organophosphorus insecticide (e.g., bromfenvinfos, chlorfenvinphos, crotoxyphos, dichlorvos, dicrotophos, dimethylvinphos, fospirate, heptenophos, methocrotophos, mevinphos, monocrotophos, naled, naftalofo, phosphamidon, propaphos, schradan, tetraethyl pyrophosphate (TEPP), tetrachlorvinphos, dioxabenzofos, fosmethilan, phenthoate, acethion, amiton, cadusafos, chlorethoxyfos, chlormephos, demephion (e.g., demephion-O or demephion-S), demeton (e.g., demeton-O or demeton-S), demeton-methyl (e.g., demeton-O-methyl or demeton-S-methyl), demeton-S-methylsulphon, disulfoton, ethion, ethoprophos, S-[(ethylsulfinyl)methyl] O,O-bis(1-methylethyl) phosphorodithioate (IPSP), isothioate, malathion, methacrifos, oxydemeton-methyl (METASYSTOX®), oxydeprofos, oxydisulfoton, phorate, sulfotep, terbufos, thiometon, amidithion, cyanthoate, dimethoate, ethoate-methyl, formothion, mecarbam, omethoate, prothoate, sophamide, vamidothion, chlorphoxim, phoxim, phoxim-methyl, azamethiphos, coumaphos, coumithoate, dioxathion, endothion, menazon, morphothion, phosalon, pyraclofos, pyridaphenthion, quinothion, dithicrofos, thicrofos, azinphos-ethyl, azinphos-methyl, dialifos, phosmet, isoxathion, zolaprofos, chlorprazophos, pyrazophos, chlorpyrifos, chlorpyrifos-methyl, butathiofos, diazinon, etrimfos, lirimfos, pirimiphos-ethyl, pirimiphos-methyl, primidophos, pyrimitate, tebupirimfos, quinalphos, quinalphos-methyl, athidathion, lythidathion, methidathion, prothidathion, isazofos, triazophos, azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3, trifenofos, butonate, trichlorfon, mecarphon, fonofos, trichloronat, cyanofenphos, O-ethyl O-(4-nitrophenyl) phenylphosphonothioate (EPN), leptophos, crufomate, fenamiphos, fosthietan, mephosfolan, phosfolan, pirimetaphos, acephate (ORTHENE®), isocarbophos, isofenphos, methamidophos, propetamphos, dimefox, mazidox, mipafox, oxadiazine insecticides, or indoxacarb), a phthalimide insecticide (e.g., dialifos, phosmet, or tetramethrin), a pyrazole insecticide (e.g., acetoprole, ethiprole, fipronil, tebufenpyrad, tolfenpyrad, or vaniliprole), a pyrethroid insecticide (e.g., acrinathrin, allethrin (e.g., bioallethrin), barthrin, bifenthrin, bioethanomethrin, cyclethrin, cycloprothrin, cyfluthrin (e.g., beta-cyfluthrin), cyhalothrin (e.g., gamma-cyhalothrin or lambda-cyhalothrin), cypermethrin (e.g., alpha-cypermethrin, beta-cypermethrin, theta-cypermethrin, or zeta-cypermethrin), cyphenothrin, deltamethrin, dimefluthrin, dimethrin, empenthrin, fenfluthrin, fenpirithrin, fenpropathrin, fenvalerate (e.g., esfenvalerate), flucythrinate, fluvalinate (e.g., tau-fluvalinate (MAVRIK®)), furethrin, imiprothrin, metofluthrin, permethrin (e.g., biopermethrin or transpermethrin), phenothrin, prallethrin, profluthrin, pyresmethrin, resmethrin (e.g., bioresmethrin or cismethrin), tefluthrin, terallethrin, tetramethrin, tralomethrin, transfluthrin, etofenprox, flufenprox, halfenprox, protrifenbute, or silafluofe), a pyrimidinamine insecticide (e.g., flufenerim or pyrimidifen), a pyrrole insecticide (e.g., chlorfenapyr), a tetronic acid insecticide (e.g., spiromesifen), a thiourea insecticide (e.g., diafenthiuron, urea insecticides, flucofuron, or sulcofuron), closantel, crotamiton, thioperoxydicarbonic acid diethyl ester (EXD), fenazaflor, fenoxacrim, hydramethylnon, isoprothiolane, malonoben, metoxadiazone, nifluridide, pyridaben, pyridalyl, rafoxanide, triarathene, triazamate, fluosilicate, lethane, thanite, magnesium phosphide (DETIA GAS-EX-B-FORTE®), imidachloprid (ADMIRE®, MARATHON®, RAXIL SECUR®), insecticidal soap (M-PEDE®, SAFER SOAP®), or chinomethionat (MORESTAN®).

In embodiments, the repellant is an insect repellant, a bird repellant, or a mammal repellant. In embodiments, the repellant is an insect repellant. In embodiments, the repellant is a bird repellant. In embodiments, the repellant is a mammal repellant. In embodiments, the insect repellant is butopyronoxyl, dibutyl phthalate, N,N-diethyl-m-toluamide (DEET) (AUTAN EXTREME®), dimethyl carbate, dimethyl phthalate, ethohexadiol, hexamide, methoquin-butyl, methylneodecanamide, oxamate, picaridin/KBR 3023, Citronella, Pelargoniumon, or SS-220. In embodiments, the bird repellant is anthraquinone, chloralose, copper oxychloride/R6, diazinon, guazatine, methiocarb, thiram, trimethacarb, or ziram. In embodiments, the mammal repellant is copper naphthenate, trimethacarb, zinc naphthenate, or ziram.

In embodiments, the repellant is butopyronoxyl, dibutyl phthalate, N,N-diethyl-m-toluamide (DEET) (AUTAN EXTREME®), dimethyl carbate, dimethyl phthalate, ethohexadiol, hexamide, methoquin-butyl, methylneodecanamide, oxamate, picaridin/KBR 3023, Citronella, Pelargoniumon, SS-220, anthraquinone, chloralose, copper oxychloride/R6, diazinon, guazatine, methiocarb, thiram, trimethacarb, ziram, copper naphthenate, or zinc naphthenate.

In embodiments, the avicide is 4-aminopyridine, chloralose, endrin, fenthion, or strychnine.

In embodiments, the rodenticide is an indandione rodenticide (e.g., chlorophacinone, diphacinone, or pindone), an organophosphorus rodenticide (e.g., phosacetim), a pyrimidinamine rodenticide (e.g., crimidine), a γ-glutamyl-carboxylase inhibitor (coumarin rodenticide) (e.g., brodifacoum, bromadiolone, coumachlor, coumafuryl, coumatetralyl, difenacoum, difethialone, flocoumafen, or warfarin), an aconitase inhibitor (e.g., fluoracetamide or sodium fluoroacetate), an inorganic rodenticide (e.g., aluminum phosphide (CELPHOS®, DEGESCH FUMIGATION TABLETS®, FUMITOXIN®), arsenous oxide, white or yellow elemental phosphorus, potassium arsenite, sodium arsenite, or thallium sulfate), a thiourea rodenticide (e.g., α-naphthylthiourea (ANTU) (ANTU®)), a urea rodenticide (e.g., pyrinuron), a fumigant (e.g., calcium cyanide (CaCN2) (CYMAG®), carbon monoxide (CO), carbon dioxide (CO2), petrol chloroform, carbon tetrachloride (CCl4), dichloroethane, ethylene dibromide, dibromochloropropane, methyl bromide, EDTC mixture, gamma-hexachlorocyclohexane (gamma-HCH), HC, lindane, a GABA antagonist (e.g., tetramine (tetramethylene disulfotetramine)), a voltage gated sodium channels inhibitor (e.g., dichlorodiphenyl trichloroethane (DDT)), bromethalin, chloralose, α-chlorohydrin, ergocalciferol, flupropadine, hydrogen cyanide, or norbomide (RATICATE®).

In embodiments, the synergist is piperonyl butoxide, piprotal, propyl isome, sesamex, sesamolin, or sulfoxide.

In embodiments, the antifeedant is chlordimeform, fentin, guazatine, or pymetrozine.

In embodiments, the chemosterilant is apholate, bisazir, busulfan, diflubenzuron, dimatif, hemel, hempa, metepa, methiotepa, methyl apholate, morzid, penfluron, tepa, thiohempa, thiotepa, tretamine, or uredepa.

In embodiments, the agriculturally active ingredient comprises a copper chromated arsenate (CCA), calcium cyanide, a dinitrophenol, a naphthylindane-1,3-dione, nicotine sulfate, nonanol, piperazine, a polybutene, potassium ethylxanthate, sodium cyanide, a thiocyanatodinitrobenzene, a trichlorotrinitrobenzene, or zinc trichlorophenoxide.

In embodiments, the agricultural formulation comprises a herbicide selected from the group consisting of glyphosate, glufosinate, thiocarbamates, difenzoquat, pyridazinone, nicotinanilide, fluridone, isoxazolidinone, diphenylether; N-phenylphthalimide, oxadiazole, triazolinone, chloroacetamides, oxyacetamide, phthalamate, N-phenylphthalimide, oxadiazole, triazolinone, acetamides, benzoylisoxazol, isoxazole, pyrazole, pyrazolium, triketone, benzofuran, acetochlor, clethodim, dicamba, flumioxazin, fomesafen, metolachlor, triasulfuron, mesotrione, topramezone, quizalofop, saflufenacil, sulcotrione, 2,4-dichlorophenoxyacetic, salts thereof, and mixtures thereof.

In embodiments, the agricultural liquid comprises a micronutrient, which comprises an element selected from the group consisting of boron, copper, manganese, iron, chorine, molybdenum, zinc, and mixtures thereof.

In embodiments, addition of the adjuvant composition to an agricultural formulation results in a composition that exhibits thixotropy.

In embodiments, the amount of the adjuvant composition added is sufficient to impart to the composition a property selected from the group consisting of run-off prevention, drip resistance, and rain-fastness. In embodiments, the amount of adjuvant composition added is sufficient for foliar application.

In embodiments, there are provided methods comprising adding to an agrochemical formulation an adjuvant composition comprising a microfibrillated cellulose, a surfactant or dispersant, and a liquid carrier, wherein the adjuvant composition is formed by subjecting the microfibrillated cellulose, the surfactant or dispersant, and the liquid carrier to shear conditions and wherein an amount of adjuvant added is sufficient to provide a target viscosity to the agrochemical formulation.

In embodiments, methods disclosed herein generally target a rheological structure (G' and G") that is in a range from about 30 Pa to about 200 Pa for G' and 3 Pa to about 30 Pa for G"

In embodiments, the amount of the adjuvant added is sufficient to suspend a particulate form of an agriculturally active agent for a target period of time. For example, at least one hour, or at least 2 hours, or at least 5 hours, or at least 24 hours, or at least 48 hours, or at least 72 hours, or at least one week, or at least about one month.

In embodiments, methods employ an amount of the adjuvant sufficient to provide drip resistance and/or rain-fastness in foliar applications. In embodiments, the amount of the adjuvant added is sufficient to prevent run-off. This typically requires less than 0.1% MFC on a dry weight basis In embodiments, the compositions and methods further comprise a rain fastener. Exemplary rain fasteners include, without limitation, a trisiloxane, a mineral oil, and a seed oil. Further examples include, without limitation, polyterpenebased resins such as ALTASTICK™ R, polyvinyl pyrrolidones (such as PVP K 90), silicone compounds, and cellulosic compounds. Any of the aforementioned rain fastners may be used in any combination and may optionally employ a wetting agent in conjunction with their use.

In embodiments, there are provided methods comprising adding to an agricultural formulation comprising an agriculturally active ingredient an adjuvant composition comprising a microfibrillated cellulose, a surfactant or dispersant; and a liquid carrier, wherein the adjuvant composition is formed by subjecting the microfibrillated cellulose, the surfactant or dispersant, and the liquid carrier to shear conditions.

III. Embodiments

P1. In embodiments, there are provided agricultural compositions comprising an adjuvant composition for enhancing the rheological structure of the agricultural composition, wherein the adjuvant composition comprises a microfibrillated cellulose dispersed in a highly ionic liquid; and an agricultural solution comprises at least one of fertilizer, pesticide, fungicide, insecticide, herbicide, growth regulator, safener, and micronutrient.

P2. In embodiments, the microfibrillated cellulose is present at a concentration of from about 0.01% by weight to 5% by weight of the adjuvant composition.

P3. In embodiments, the microfibrillated cellulose is present at a concentration of from about 0.01% by weight to 5% by weight of the agricultural composition.

P4. In embodiments, the highly ionic liquid comprises a fertilizer, wherein the fertilizer comprises at least one of a nitrogen source, a phosphorus source, and a potassium source, wherein the nitrogen source, the phosphorus source, and the potassium source are present in amounts to provide a NPK (nitrogen-phosphorus-potassium) value of between 0-40:0-50:0-40, with the proviso that at least one of the value of the nitrogen source, the phosphorus, and the potassium source is not zero.

P5. In embodiments, the nitrogen source is selected from the group consisting of ammonia, urea, urea phosphate, thiourea, ammonium sulfate, ammonium nitrate, potassium nitrate, ammonium phosphate, ammonium polyphosphate, ammonium chloride, diammonium phosphate (DAP), urea triazone, amino acids, aromatic nitrogen or heterocyclic nitrogen compounds, hexamethylene tetraamine, melamine, nitrobenzene, and mixtures thereof.

P6. In embodiments, the phosphorous source is selected from the group consisting of phosphate salts, phosphite salts, calcium phosphate, nitro phosphate, potassium phosphate, mono ammonium phosphate, di-ammonium phosphate, triple super phosphate, phosphoric acid, phosphorous acid, polyphosphoric acid, HEDP (1-hydroxyethane 1,1-diphosphonic acid), AMP (Adenosine monophosphate), amino-tris (methylenephosphonic acid), phosphorous pentoxide, and mixtures thereof.

P7. In embodiments, the potassium source is selected from the group consisting of potassium sulfate, potassium phosphate, potassium oxide, potassium hydroxide, potassium chloride, potassium nitrate, potassium carbonate, potassium bicarbonate, potassium magnesium sulfate, and mixtures thereof.

P8. In embodiments, the adjuvant composition is formulated as an emulsifiable concentrate (EC), suspension concentrate (SC), capsule suspension (CS), water-soluble concentrate (SL), an emulsion (EW), a micro-emulsion (ME), an oil-based suspension concentrate (OD), an aqueous suspo-emulsion (SE), or a microencapsulated suspension (CS).

P9. In embodiments, the agricultural solution comprises a micronutrient comprises an element selected from the group consisting of boron, copper, manganese, iron, chlorine, molybdenum, zinc, and mixtures thereof.

P10. In embodiments, adjuvant compositions further comprises a surfactant selected from the group consisting of alkyl polyglucosides, dodecyl benzene sulfonate salts, Allosperse, phosphate esters, triethanol amines, polymeric amines, lignosulfonates, pluronic type surfactants, cyclodextrins, molecular cages, Chitosan, Star polymers, dendrimers and nanogels.

P11. In embodiments, the agricultural composition is a homogenous solution for at least 0.5 hours after combining the adjuvant composition and the agricultural solution at a temperature between 0° C. and 40° C.

P12. In embodiments, method of preparing an agricultural composition comprising providing an adjuvant composition comprising a microfibrillated cellulose dispersed in a highly ionic liquid, wherein the microfibrillated cellulose is present at a concentration of from about 0.01% by weight to 5% by weight of the adjuvant composition; and diluting the adjuvant composition with an agricultural solution such that the microfibrillated cellulose is present at a concentration of from about 0.01% by weight to 5% by weight of the agricultural composition, wherein the agricultural solution comprises at least one of fertilizer, pesticide, fungicide, insecticide, herbicide, growth regulator, safener, and micronutrient.

P13. In embodiments, the agricultural composition is a homogenous solution for at least 0.5 hours after combining the adjuvant composition and the agricultural solution at a temperature between 0° C. and 40° C.

P14. In embodiments, method of treating a crop or soil, comprising applying to the crop or soil an agricultural composition, wherein the agricultural composition comprising an adjuvant composition comprises a microfibrillated cellulose dispersed in a highly ionic liquid; and an agricultural solution comprises at least one of fertilizer, pesticide, fungicide, insecticide, herbicide, growth regulator, safener, and micronutrient, wherein the agricultural composition maintains in stable dispersion for a period of at least 0.5 hour at a temperature between 0° C. and 40° C.

P15. In embodiments, the application rate is from about 1 liter per acre to about 10,000 liters per acre.

P16. In embodiments, the application can cover to up 300 acres.

P17. In embodiments, the agricultural composition is applied to the crop or the soil during pre-emergence period or post-harvest.

IV. Other Embodiments

In embodiments, there are provided adjuvant compositions comprising a microfibrillated cellulose (MFC), a surfactant or dispersant, and a liquid carrier, wherein the adjuvant composition is formed by subjecting the MFC, the surfactant or dispersant, and the liquid carrier to shear conditions sufficient to alter the rheological structure of commercial MFC.

In embodiments, the altered rheological structure comprises an increase of the storage modulus (G') and the loss modulus (G''). In embodiments, all references herein to increase in storage and loss moduli are at temperatures above about 15° C.

In embodiments, the altered rheological structure comprises of a decrease in the temperature dependence of the storage modulus (G') and the loss modulus (G").

In embodiments, the liquid carrier is a fertilizer.

In embodiments, the liquid carrier is water.

In embodiments, the liquid carrier is a micronutrient.

In embodiments, the liquid carrier is a biostimulant.

In embodiments, the liquid carrier is any aqueous mixture of one or more of a fertilizer, micronutrient, or biostimulant.

In embodiments, the microfibrillated cellulose is present at a concentration of from about 0.01% by weight to 5% by weight of dry microfibrillated cellulose. In embodiments, MFC is present from about 0.01% by weight to 1% by weight of dry microfibrillated cellulose. In embodiments, MFC is present from about 0.01% by weight to 0.5% by weight of dry microfibrillated cellulose.

In embodiments, the surfactant or dispersant are present in an amount from about 0.01% w/w to about 95% w/w of the adjuvant composition. In embodiments, surfactant or dispersant are present from about 0.01% w/w to about 50% w/w of the adjuvant composition. In embodiments, surfactant or dispersant are present from about 0.01% w/w to about 5% w/w of the adjuvant composition. In embodiments, surfactant or dispersant are present from about 0.01% w/w to about 1% w/w of the adjuvant composition.

In embodiments, there are provided adjuvant compositions comprising a microfibrillated cellulose, a surfactant or dispersant, and a fertilizer, wherein the adjuvant composition is formed by subjecting the microfibrillated cellulose, the surfactant or dispersant, and the fertilizer to shear conditions sufficient to alter the rheological structure of commercial MFC.

In embodiments, the altered rheological structure comprises an increase of the storage modulus (G') and the loss modulus (G").

In embodiments, the altered rheological structure comprises a decrease in the temperature dependence of the storage modulus (G') and the loss modulus (G").

In embodiments, the surfactant or dispersant is selected from alkyl polyglycosides, phosphate esters, triethanol amine or ethoxylated amines.

In embodiments, there are provided compositions comprising a formulation of an agriculturally active ingredient, and an adjuvant composition comprising a microfibrillated cellulose, a surfactant or dispersant, and a liquid carrier, wherein the adjuvant composition is formed by subjecting the microfibrillated cellulose, the surfactant or dispersant, and the liquid carrier to shear conditions sufficient to alter the rheological structure of commercial MFC.

In embodiments, the altered rheological structure comprises an increase of the storage modulus (G') and the loss modulus (G").

In embodiments, the altered rheological structure comprises a decrease in the temperature dependence of the storage modulus (G') and the loss modulus (G").

In embodiments, the formulation comprises a capsule suspension (CS).

In embodiments, the formulation comprises a microemulsion (ME).

In embodiments, the formulation comprises a suspension concentrate (SC).

In embodiments, the formulation comprises solid particles of the agriculturally active ingredient.

In embodiments, the agriculturally active formulation comprises an emulsifiable concentrate (EC).

In embodiments, the agriculturally active formulation comprises a suspoemulsion (SE).

In embodiments, the agriculturally active ingredient comprises at least one of a pesticide, a bactericide, an algaecide, a nematicide, a fungicide, a larvicide, an insecticide, an herbicide, an herbicide safener, a plant growth regulator, a plant activator, a synergist, an acaricide, a molluscicide, a repellant, a biological pesticide, a biostimulant, and a micronutrient.

In embodiments, the amount of the adjuvant composition added is sufficient to impart to the composition a property selected from the group consisting of run-off prevention, drip resistance, rain-fastness, enhanced foliar uptake.

In embodiments, the adjuvant stabilizes the formulation for at least 2 hours and as much as 48 months. In embodiments, the adjuvant stabilizes the formulation for at least 8 hours and as much as 24 hours. In embodiments, the adjuvant stabilizes the formulation for at least 24 hours and as much as one week. In embodiments, the adjuvant stabilizes the formulation for at least 1 week and as much as 1 month. In embodiments, the adjuvant stabilizes the formulation for at least 1 month and as much as 12 months. In embodiments, the adjuvant stabilizes the formulation for at least 12 months and as much as 48 months. Because the adjuvant can be titrated to any desired amount in a formulation, sufficient amount of the adjuvant can be added to stabilize a formulation for nearly any targeted amount of time.

In embodiments, the liquid carrier comprises a fertilizer.

In embodiments, there are provided methods comprising adding to a fertilizer or a high ionic strength solution an adjuvant composition comprising a microfibrillated cellulose, a surfactant or dispersant, and a liquid carrier, wherein the adjuvant composition is formed by subjecting the microfibrillated cellulose, the surfactant or dispersant, and the liquid carrier to shear conditions sufficient to alter the rheological structure of commercial MFC and wherein an amount of adjuvant added is sufficient to provide a target viscosity to the agrochemical formulation.

In embodiments, the altered rheological structure comprises an increase of the storage modulus (G') and the loss modulus (G").

In embodiments, the altered rheological structure comprises of a decrease in the temperature dependence of the storage modulus (G') and the loss modulus (G").

In embodiments, the amount of the adjuvant added is sufficient to suspend a particulate form of an agricultural agent for a target period of time to allow uniform application of the agricultural agent to the desired crop.

In embodiments, the amount of the adjuvant added is sufficient to provide drip resistance and/or rain-fastness in foliar applications.

In embodiments, the amount of the adjuvant added is sufficient to prevent run-off.

In embodiments, methods may further comprise adding a rain fastener.

In embodiments, there are provided adjuvant compositions consisting essentially of a microfibrillated cellulose, a surfactant or dispersant and a liquid carrier.

In embodiments, there are provided kits comprising adjuvant compositions consisting essentially of a microfibrillated cellulose, a surfactant or dispersant and a liquid carrier, along with instructions for tank mixing with an agricultural formulation. In embodiments, the instructions provide for foliar application.

In embodiments, there are provided adjuvant compositions consisting essentially of a microfibrillated cellulose, a surfactant or dispersant and a fertilzer.

In embodiments, there are provided kits comprising adjuvant compositions consisting essentially of a microfibrillated cellulose, a surfactant or dispersant and a fertilizer, along with instructions for tank mixing with an agricultural formulation.

In embodiments, there are provided methods of applying an agricultural formulation comprising an agriculturally active compound, the method comprising adding an adjuvant compositions consisting essentially of a microfibrillated cellulose, a surfactant or dispersant and a liquid carrier to the agricultural formulation.

In embodiments, there are provided methods of applying an agricultural formulation comprising an agriculturally active compound, the method comprising adding an adjuvant compositions consisting essentially of a microfibrillated cellulose, a surfactant or dispersant and a liquid carrier to the agricultural formulation, wherein the amount of adjuvant composition is sufficient to impart drip resistance to the agricultural formulation.

In embodiments, there are provided methods of applying an agricultural formulation comprising an agriculturally active compound, the method comprising adding an adjuvant compositions consisting essentially of a microfibrillated cellulose, a surfactant or dispersant and a liquid carrier to the agricultural formulation, wherein the amount of adjuvant composition is sufficient to impart rain-fastness to the agricultural formulation.

In embodiments, there are provided methods of applying an agricultural formulation comprising an agriculturally active compound, the method comprising adding an adjuvant compositions consisting essentially of a microfibrillated cellulose, a surfactant or dispersant and a liquid carrier to the agricultural formulation, wherein the amount of adjuvant composition is sufficient to prevent run-off.

EXAMPLES

The following examples are being submitted to illustrate embodiments of the present disclosure. There Examples are intended to be illustrative only and are not intended to limit the scope of the present disclosure. Examples 1 to 7 below are intended to describe the utility of the adjuvant to eliminate flocculation and screen residues when an agrochemical is mixed with cold fertilizer.

Example 1—Adjuvant Preparation

Adjuvant A was prepared by mixing microfibrillated cellulose (MFC) with water and an alkyl polyglucoside (Agnique 9116) at 10000 rpm using a 1 inch blade until a G' of 100 pascals and a G" of 16 pascals was achieved. The concentration of MFC was 0.5% dry weight in the final mixture.

Example 2—Adjuvant Mixing with Fertilizer

Adjuvant A prepared in example 1 was cooled to about 3.5° C. and was diluted with 10-34-0 fertilizer also kept at 3.5° C. The dilution ratio was 5 to 95 giving a final concentration of MFC of 0.025% w/w in the final dilution. This was labelled fertilizer Alpha Example 3—Adjuvant Mixing with Fertilizer Adjuvant A prepared in example 1 was cooled to about 3.5° C. and was diluted with 6-24-6 fertilizer from J.R Simplot also kept at 3.5° C. The dilution ratio was 5 to 95 giving a final concentration of MFC of 0.025% w/w in the final dilution. This was labelled fertilizer Beta.

Example 4—Mixing Fertilizer Containing Adjuvant with an Agrochemical

Fertilizer Alpha from example 2 kept at 3.5° C. was mixed with a capsule suspension of Index CS also kept at 3.5° C. at a ratio of 98 to 2 in a 100 mL graduated cylinder and inverted 10 times using gentle inversion motion as prescribed by CIPAC MT 180. The final suspension was kept for two hours at 3.5° C. and inspected for flocculation, supernate formation, sedimentation and filtered through a 50 Mesh screen and the screens were inspected for residues. No flocculation, supernate or sediment were observed in the cylinder and no residues were observed in the 50 Mesh screens.

Example 5—Mixing Fertilizer Containing Adjuvant with an Agrochemical

Fertilizer Beta from example 3 kept at 3.5° C. was mixed with a capsule suspension of Index CS also kept at 3.5° C. at a ratio of 98 to 2 in a 100 mL graduated cylinder and inverted 10 times using gentle inversion motion as prescribed by CIPAC MT 180. The final suspension was kept for two hours at 3.5° C. and inspected for flocculation, supernate formation, sedimentation and filtered through a 50 Mesh screen and the screens were inspected for residues. No flocculation, supernate or sediment were observed in the cylinder and no residues were observed in the 50 Mesh screens.

Example 6—Mixing Fertilizer not Containing Adjuvant with an Agrochemical 10-34-0 fertilizer with no adjuvant kept at 3.5° C. was mixed with a capsule suspension of Index CS also kept at 3.5° C. at a ratio of 98 to 2 in a 100 mL graduated cylinder and inverted 10 times using gentle inversion motion as prescribed by CIPAC MT 180. The final suspension was kept for two hours at 3.5° C. and inspected for flocculation, supernate formation, sedimentation and filtered through a 50 Mesh screen and the screens were inspected for residues. Mild flocculation, and no supernate or sediment were observed in the cylinder and residues of the flocculated material were observed in the 50 Mesh screens.

Example 7—Mixing Fertilizer not Containing Adjuvant with an Agrochemical 6-24-6 fertilizer from J.R. Simplot with no adjuvant kept at 3.5° C. was mixed with a capsule suspension of Index CS also kept at 3.5° C. at a ratio of 98 to 2 in a 100 mL graduated cylinder and inverted 10 times using gentle inversion motion as prescribed by CIPAC MT 180. The final suspension was kept for two hours at 3.5° C. and inspected for flocculation, supernate formation, sedimentation and filtered through a 50 Mesh screen and the screens were inspected for residues. Mild flocculation, and no supernate or sediment were observed in the cylinder and residues of the flocculated material were observed in the 50 Mesh screens.

Examples 8 to 21 are meant to describe the dispersion behavior of emulsifiable concentrates dispersing in fertilizer solutions with and without adjuvants.

Example 8—Adjuvant Preparation

Adjuvant B was prepared by dispersing MFC with water and a phosphate ester (Agrilan 1028). The MFC was contained at 0.3% dry weight in the adjuvant and it was sheared at 5000 RPM with a ½ inch blade for a period of time sufficient to achieve a G' of 60 pascals and a G" of 10 pascals.

Example 9—Adjuvant Mixing with Fertilizer

Adjuvant B as prepared in example 8 was kept at 25° C. and was diluted with 10-34-0 fertilizer also kept at 25° C. The dilution ratio was 15 to 85 giving a final concentration of MFC of 0.045% w/w in the final dilution. This was labelled fertilizer Gamma Example 10—Adjuvant Mixing with Fertilizer Adjuvant B as prepared in example 8 was kept at 25° C. and was diluted with PMAX Plus by Rosens, Inc., a fertilizer labelled 7-20-3 plus micronutrients, also kept at 25° C. The dilution ratio was 30 to 70 giving a final concentration of MFC of 0.06% w/w in the final dilution. This was labelled fertilizer Delta Example 11—Adjuvant Mixing with Fertilizer Adjuvant B as prepared in example 8 was kept at 25° C. and was diluted with a 3-18-18 fertilizer, also kept at 25° C. The dilution ratio was 10 to 90 giving a final concentration of MFC of 0.03% w/w in the final dilution. This was labelled fertilizer Epsilon Example 12—Mixing Fertilizer Containing Adjuvant with an Agrochemical Fertilizer Gamma from example 9 kept at 25° C. was mixed with an emulsifiable concentrate of Bifenthrin 2 EC also kept at 25° C. at a ratio of 97 to 3 in a 100 mL graduated cylinder and inverted 10 times using gentle inversion motion as prescribed by CIPAC MT 180. The final suspension was kept for 1 week at 25° C. and examined after 2 hours, 24 hours and 1 week for flocculation, supernate formation, sedimentation and was then filtered through a 50 Mesh screen and the screens were inspected for residues. No flocculation, supernate or sediment were observed in the cylinder during any of the observations and no residues were observed in the 50 Mesh screens after 1-week storage.

Example 13—Mixing Fertilizer Containing Adjuvant with an Agrochemical

Fertilizer Delta from example 10 kept at 25° C. was mixed with an emulsifiable concentrate of Bifenthrin 2 EC also kept at 25° C. at a ratio of 97 to 3 in a 100 mL graduated cylinder and inverted 10 times using gentle inversion motion as prescribed by CIPAC MT 180. The final suspension was kept for 1 week at 25° C. and examined after 2 hours, 24 hours and 1 week for flocculation, supernate formation, sedimentation and was then filtered through a 50 Mesh screen and the screens were inspected for residues. No flocculation, supernate or sediment were observed in the cylinder during any of the observations and no residues were observed in the 50 Mesh screens after 1-week storage.

Example 14—Mixing Fertilizer Containing Adjuvant with an Agrochemical

Fertilizer Epsilon from example 11 kept at 25° C. was mixed with an emulsifiable concentrate of Bifenthrin 2 EC also kept at 25° C. at a ratio of 97 to 3 in a 100 mL graduated cylinder and inverted 10 times using gentle inversion motion as prescribed by CIPAC MT 180. The final suspension was kept for 1 week at 25° C. and examined after 2 hours, 24 hours and 1 week for flocculation, supernate formation, sedimentation and was then filtered through a 50 Mesh screen and the screens were inspected for residues. No flocculation, supernate or sediment were observed in the cylinder during any of the observations and no residues were observed in the 50 Mesh screens after 1-week storage.

Example 15—Mixing Fertilizer Containing Adjuvant with an Agrochemical

Fertilizer Delta from example 10 kept at 25° C. was mixed with an emulsifiable concentrate containing both abamectin and bifenthrin (EC) also kept at 25° C. at a ratio of 98 to 2 in a 100 mL graduated cylinder and inverted 10 times using gentle inversion motion as prescribed by CIPAC MT 180. The final suspension was kept for 1 week at 25° C. and examined after 2 hours, 24 hours and 1 week for flocculation, supernate formation, sedimentation and was then filtered through a 50 Mesh screen and the screens were inspected for residues. No flocculation, supernate or sediment were observed in the cylinder during any of the observations and no residues were observed in the 50 Mesh screens after 1-week storage.

Example 16—Mixing Fertilizer Containing Adjuvant with an Agrochemical

Fertilizer Gamma from example 9 kept at 25° C. was mixed with an emulsifiable concentrate containing both abamectin and bifenthrin (EC) also kept at 25° C. at a ratio of 98 to 2 in a 100 mL graduated cylinder and inverted 10 times using gentle inversion motion as prescribed by CIPAC MT 180. The final suspension was kept for 1 week at 25° C. and examined after 2 hours, 24 hours and 1 week for flocculation, supernate formation, sedimentation and was then filtered through a 50 Mesh screen and the screens were inspected for residues. No flocculation, supernate or sediment were observed in the cylinder during any of the observations and no residues were observed in the 50 Mesh screens after 1-week storage.

Example 17—Mixing Fertilizer not Containing Adjuvant with an Agrochemical 3-18-18 fertilizer with no adjuvant kept at 25° C. was mixed with a suspension concentrate of Capture LFR, and industry standard for fertilizer compatibility, also kept at 25° C. at a ratio of 98 to 2 in a 100 mL graduated cylinder and inverted 10 times using gentle inversion motion as prescribed by CIPAC MT 180. The final suspension was kept at 25° C. for 1 week and inspected after 2 hours, 24 hours and 1 week for flocculation, supernate formation, sedimentation and then filtered through a 50 Mesh screen and the screens were inspected for residues. Significant supernate and sediment were observed in the cylinder after two hours and all other observation points and significant residues of the flocculated material were observed in the 50 Mesh screens.

Example 18—Mixing Fertilizer not Containing Adjuvant with an Agrochemical

PMAX Plus by Rosens, Inc., a fertilizer labelled 7-20-3 plus micronutrients with no adjuvant kept at 25° C. was mixed with an emulsifiable concentrate of Bifenthrin 2 EC also kept at 25° C. at a ratio of 98 to 2 in a 100 mL graduated cylinder and inverted 10 times using gentle inversion motion as prescribed by CIPAC MT 180. The final suspension was kept for one week at 25° C. and inspected at 2 hours, 24 hours and one week for flocculation, supernate formation, sedimentation and then filtered through a 50 Mesh screen and the screens were inspected for residues. Significant supernate and sediment were observed in the cylinder after two hours and all other observation periods and significant residues of the undispersed material were observed in the 50 Mesh screens.

Example 19—Mixing Fertilizer not Containing Adjuvant with an Agrochemical 10-34-0 fertilizer with no adjuvant kept at 25° C. was mixed with an emulsifiable concentrate of Bifenthrin 2 EC also kept at 25° C. at a ratio of 98 to 2 in a 100 mL graduated cylinder and inverted 10 times using gentle inversion motion as prescribed by CIPAC MT 180. The final suspension was kept for one week at 25° C. and inspected at 2 hours, 24 hours and one week for flocculation, supernate formation, sedimentation and then filtered through a 50 Mesh screen and the screens were inspected for residues. Significant supernate and sediment were observed in the cylinder after two hours and all other observation periods and significant residues of the undispersed material were observed in the 50 Mesh screens.

Example 20—Mixing Fertilizer not Containing Adjuvant with an Agrochemical 10-34-0 fertilizer with no adjuvant kept at 25° C. was mixed with an emulsifiable concentrate containing both abamectin and bifenthrin (EC) also kept at 25° C. at a ratio of 98 to 2 in a 100 mL graduated cylinder and inverted 10 times using gentle inversion motion as prescribed by CIPAC MT 180. The final suspension was kept for one week at 25° C. and inspected at 2 hours, 24 hours and one week for flocculation, supernate formation, sedimentation and then filtered through a 50 Mesh screen and the screens were inspected for residues. Significant supernate and sediment were observed in the cylinder after two hours and all other observation periods and significant residues of the undispersed material were observed in the 50 Mesh screens.

Example 21—Mixing Fertilizer not Containing Adjuvant with an Agrochemical

PMAX Plus by Rosens, Inc., a fertilizer labelled 7-20-3 plus micronutrients with no adjuvant kept at 25° C. was mixed with an emulsifiable concentrate containing both abamectin and bifenthrin (EC) also kept at 25° C. at a ratio of 98 to 2 in a 100 mL graduated cylinder and inverted 10 times using gentle inversion motion as prescribed by CIPAC MT 180. The final suspension was kept for one week at 25° C. and inspected at 2 hours, 24 hours and one week for flocculation, supernate formation, sedimentation and then filtered through a 50 Mesh screen and the screens were inspected for residues. Significant supernate and sediment were observed in the cylinder after two hours and all other observation periods and significant residues of the undispersed material were observed in the 50 Mesh screens.

Example 22—Rheology Characteristics of Microfibrillated Cellulose Solutions

Exilva 2% dispersions (Exilva F01-L, Borregaard AS) as-supplied were diluted with water to 0.5% dry weight concentration and then exposed to high shear and their rheological structure determined by measuring their plastic (G") and elastic (G') modulus using a DHR-3 low shear rheometer by TA Instruments. The values are tabulate in Table A. As indicated in Table 1, the MFC material changed in the structure of the microfibrils allowing for more physico-chemical entanglement.

TABLE 1

| Material | G' Pascals | G" Pascals |
| --- | --- | --- |
| Example Zeta<br>Exilva 2% diluted to 0.5% no shear | 29 | 5.6 |
| Example Eta<br>Exilva 2% diluted to 0.5% with shear<br>(10,000 RPM, 1 inch blade 4 minutes) | 57 | 9.7 |
| Example Theta<br>Exilva 2% diluted to 0.5% with shear<br>(10,000 RPM, 1 inch blade 8 minutes) | 125 | 21 |

The materials described in Table 1 were then mixed at low shear with 5% alkyl polyglucoside (Agnique 9116, BASF) and used as adjuvants in a 10-34-0 fertilizer system at a ratio of 95:5 of fertilizer:adjuvant. The adjuvant-enhanced fertilizer solutions were then tested for their ability to disperse an emulsifiable concentrate of Bifenthrin 2EC at a ratio of 98:2 of Fertilizer:Bifenthrin 2EC. All three adjuvants showed good ability to disperse the Bifenthrin 2EC in the fertilizer but after two hours of standing the fertilizer/Bifenthrin mixture that used the adjuvant from example Zeta showed instability in the form of supernate formation while the mixtures utilizing the adjuvants form Examples Eta and Theta showed no separation. It would be clear to someone skilled in the art that having a structure of at least 57 Pascals of G' and 9.7 Pascals of G" for an adjuvant at a dilution of 0.5% MFC (Dry weight) is needed to provide optimum adjuvancy effect that includes both good short and long term dispersion characteristics.

Example 22

Emulsifiable Concentrate (EC) Formulations with Liquid Fertilizers

The goal of Example 22 is to test the compatibility and stability of emulsifiable concentrate formulations with different liquid fertilizers: 10-34-0, 8-24-6, and 6-24-6, in the presence of MFC adjuvant.
EC Formulation Containing Bifenthrin and Liquid Fertilizer 10-34-0+MFC Adjuvant 5 mL of an aqueous suspension of MFC adjuvant (containing 0.3 weight % of MFC, e.g., 0.3 wt. % of Exilva cellulose fibrils) was added to 45 mL of standard starter liquid fertilizer 10-34-0 in a 100-mL graduated cylinder, and the graduated cylinder was inverted 3 times. To the resulting mixture of the liquid fertilizer 10-34-0 and the MFC adjuvant was added 1.25 mL of an EC formulation containing Bifenthrin (a small amount of oil soluble blue dye was added to a commercial batch of Bifentrhin 2EC for better visual evaluation of compatibility with highly ionic liquids), and the graduated cylinder was inverted ten times. The resulting mixture was left undisturbed for 2 hours and visual observations were recorded after 2 hours.
EC Formulation Containing Bifenthrin and Liquid Fertilizer 10-34-0 (without MFC Adjuvant)

1.25 mL of an EC formulation containing Bifenthrin was added to 45 mL of liquid fertilizer 10-34-0 in a 100-mL graduated cylinder, and the graduated cylinder was inverted ten times. The resulting mixture was left undisturbed for 2 hours and visual observations were recorded after 2 hours.
Observations:

Two hours after inversion the sample containing the MFC adjuvant was fully dispersed while the sample that did not contain the MFC adjuvant had a visible separated oil layer belonging to the emulsifiable concentrate at the top.

EC Formulation Containing Bifenthrin and Liquid Fertilizer 8-24-6+MFC Adjuvant 5 mL of an aqueous suspension of MFC adjuvant (containing 0.3 weight % of MFC, e.g., 0.3 wt. % of Exilva cellulose fibrils) was added to 45 mL of standard starter liquid fertilizer 8-24-6 in a 100-mL graduated cylinder, and the graduated cylinder was inverted 3 times. To the resulting mixture of the liquid fertilizer 8-24-6 and the MFC adjuvant was added 1.25 mL of an EC formulation containing Bifenthrin, and the graduated cylinder was inverted ten times. The resulting mixture was left undisturbed for 2 hours and visual observations were recorded after 2 hours.

EC Formulation Containing Bifenthrin and Liquid Fertilizer 8-24-6 (without MFC Adjuvant)

1.25 mL of an EC formulation containing Bifenthrin was added to 45 mL of liquid fertilizer 8-24-6 in a 100-mL graduated cylinder, and the graduated cylinder was inverted ten times. The resulting mixture was left undisturbed for 2 hours and visual observations were recorded after 2 hours.
Observations:

Two hours after inversion the sample containing the MFC adjuvant was fully dispersed while the sample that did not contain the MFC adjuvant had a visible separated oil layer belonging to the emulsifiable concentrate at the top.

EC Formulation Containing Bifenthrin and Liquid Fertilizer 6-24-6+MFC Adjuvant 5 mL of an aqueous suspension of MFC adjuvant (containing 0.3 weight % of MFC, e.g., 0.3 wt. % of Exilva cellulose fibrils) was added to 45 mL of standard starter liquid fertilizer 6-24-6 in a 100-mL graduated cylinder, and the graduated cylinder was inverted 3 times. To the resulting mixture of the liquid fertilizer 6-24-6 and the MFC adjuvant was added 1.25 mL of an EC formulation containing Bifenthrin, and the graduated cylinder was inverted ten times. The resulting mixture was left undisturbed for 2 hours and visual observations were recorded after 2 hours.

EC Formulation Containing Bifenthrin and Liquid Fertilizer 6-24-6 (without MFC Adjuvant)

1.25 mL of an EC formulation containing Bifenthrin was added to 45 mL of liquid fertilizer 6-24-6 in a 100-mL graduated cylinder, and the graduated cylinder was inverted ten times. The resulting mixture was left undisturbed for 2 hours and visual observations were recorded after 2 hours.
Observations:

Two hours after inversion the sample containing the MFC adjuvant was fully dispersed while the sample that did not contain the MFC adjuvant had a visible separated oil layer belonging to the emulsifiable concentrate at the top.

The results of Example 22 show that MFC improves the compatibility of the emulsifiable concentrate formulations with liquid fertilizers, and MFC improves the stability of these blends (i.e., mixtures/blends of the emulsifiable concentrate and liquid fertilizer) and reduce sedimentation over time.

Example 24

Rheological data was gathered for dispersions with 0.5% wt. concentration of microfibrilated cellulose (MFC) and 5% alkly polyglucoside, prepared under different conditions: (a) no shear (b) varying time (4 or 8 minutes) and shear rate (as indicated) using a Silverson model L5M high-shear mixer with 1" mixing head in a 100 mL beaker. Rheological properties were determined with a DHR-3 strain-controlled rheometer (TA Instruments), using a Couette geometry (recessed end rotor with a diameter 14 mm and height 42 mm, cup diameter 15 mm) with a Peltier temperature control system. Dispersions were evaluated between −4-50° C., at a ramp rate of $1.5° C.·min^{-1}$, under constant strain of 0.1%, and angular frequency of 10 $rad·s^{-1}$.

The FIGURE provides an oscillatory temperature sweep showing storage (G1) and loss modulus (G") of dispersions with 0.5% wt. concentration of microfibrilated cellulose (MFC) prepared under the different shear conditions. As shown in The FIGURE, processing MFC with alkyl polyglucoside under varying shear conditions allows tuning of loss modulus and storage modulus. Moreover, the resulting products had relatively constant values for these parameters independent of temperature.

What is claimed is:

1. A method comprising:
    (i) subjecting an adjuvant composition to shear conditions sufficient to increase the storage modulus (G') or the loss modulus (G") of the adjuvant composition, the adjuvant composition comprising:
        (a) 0.01% by weight to 5% by weight of a chemically unmodified microfibrillated cellulose (MFC);
        (b) a surfactant or dispersant; and
        (c) a liquid carrier; and
    (ii) adding the adjuvant composition to a fertilizer or high ionic strength solution,
    wherein the shear conditions comprise shearing the adjuvant composition at 5000 RPM to 10,000 RPM with a blade for at least 4 minutes to achieve a G' of at least 57 Pascals and a G" of at least 9.7 Pascals, and
    wherein the high ionic strength solution comprises at least 5% saturation of a functional ion.

2. The method of claim 1, wherein the shear conditions are sufficient to decrease the temperature dependence of the storage modulus (G') and the loss modulus (G").

3. The method of claim 1, wherein the amount of the adjuvant added is sufficient to suspend a particulate form of an agricultural formulation for a target period of time to allow uniform application of the agricultural formulation to a crop.

4. The method of claim 1, wherein the amount of the adjuvant added provides drip resistance and/or rain-fastness in foliar applications.

5. The method of claim 1, wherein the amount of the adjuvant added is sufficient to prevent run-off.

6. The method of claim 1, wherein the adjuvant composition further comprises a rain fastener.

7. The method of claim 1, wherein an amount of adjuvant added provides a target viscosity to an agrochemical formulation.

8. The method of claim 1, wherein the shear conditions comprise shearing the adjuvant composition at 5000 RPM to 10,000 RPM with a blade for a sufficient period of time to achieve a G' of from 57 Pascals to 125 Pascals and a G" of from 9.7 Pascals to 21 Pascals.

* * * * *